United States Patent [19]

Bahn

[11] Patent Number: 5,111,091
[45] Date of Patent: May 5, 1992

[54] RELUCTANCE TYPE ELECTRIC MOTOR

[75] Inventor: Itsuki Bahn, Tokyo, Japan

[73] Assignee: Kabushikigaisha Sekogiken, Tokyo, Japan

[21] Appl. No.: 689,051

[22] PCT Filed: Sep. 4, 1990

[86] PCT No.: PCT/JP90/01128
§ 371 Date: May 1, 1991
§ 102(e) Date: May 1, 1991

[87] PCT Pub. No.: WO91/03868
PCT Pub. Date: Mar. 21, 1991

[30] Foreign Application Priority Data

Sep. 8, 1989 [JP] Japan .................................. 1-231433

[51] Int. Cl.[5] .................. H02K 11/00; H02K 17/12; H02P 3/08; H02P 3/14
[52] U.S. Cl. .............................. 310/68 B; 310/166; 318/254; 318/376
[58] Field of Search ............. 310/68 R, 68 B, 77, 310/166; 318/138, 254, 368, 373, 375, 376, 381, 439

[56] References Cited

U.S. PATENT DOCUMENTS

| | | | |
|---|---|---|---|
| 4,143,308 | 3/1979 | Deplante et al. | 318/254 |
| 4,253,053 | 2/1981 | Ray et al. | 318/254 |
| 4,763,056 | 8/1988 | Byrne et al. | 318/138 |
| 4,896,089 | 1/1990 | Kliman et al. | 318/254 |
| 5,012,172 | 4/1991 | Sember | 318/696 |

FOREIGN PATENT DOCUMENTS 0018018 2/1979 Japan .
0186193 7/1989 Japan .

Primary Examiner—Steven L. Stephan
Assistant Examiner—Clayton La Balle
Attorney, Agent, or Firm—Staas & Halsey

[57] ABSTRACT

A reluctance type electric motor, when an energization current in an exciting coil is interrupted at the end of a position detection signal, large magnetic energy stored in the exciting coil is prevented from being fed back to a power source by a reverse current prevention diode (43a, 43b) and it is forcedly caused to flow into an exciting coil to be next energized. Extinction of the stored magnetic energy in the preceding-stage exciting coil and accumulation of magnetic energy in the succeeding-stage exciting coil can be rapidly effected. A high-speed rotation (up to approximately 100,000 r.p.m.) can be attained with high torque obtained. If a plurality of teeth usually used for magnetic poles are provided, an effect that output torque increased by several times can be attached when a normal rotation speed is obtained. Since a chopper circuit is operated when the rotating operation is set to a reverse rotation mode, a voltage applied to the exciting coil becomes equal to the sum of a DC power source voltage and a counter-electromotive force so as to rapidly raise the exciting current, and when it reaches a preset current, energization is interrupted to make the fall of the magnetic energy stored in the exciting coil dull, and in this period of time, electric power is caused to flow into the power source by a transistor connected in parallel with the reverse current prevention diode (43a, 43b) and thus regenerated.

3 Claims, 18 Drawing Sheets

RELUCTANCE TYPE ELECTRIC MOTOR

TECHNICAL FIELD

This invention relates to a reluctance type electric motor which can be used instead of an induction motor and a semiconductor motor (brushless motor) which are well known in the art, and more particularly to a reluctance type electric motor which is effective in a case where forward and reverse rotations are required and which can be used as a servo electric motor and a driving motor for electric cars, for example.

BACKGROUND ART

Since a reluctance type electric motor is large in output torque but low in rotation speed and has other defects, it is seldom put into practice.

Particularly, it is seldom that the reluctance type motor is used in a case where high-speed rotation is required.

Further, there is no case wherein the reluctance type motor is used when both the forward and reverse rotations are required and the electromagnetic braking is necessary.

DISCLOSURE OF THE INVENTION

The first subject of this invention is as follows:

The reluctance type electric motor cannot be formed to have a large number of phases unlike the ordinary commutator motor. This is because the semiconductor circuit of each phase is expensive and use of large number of phases makes it impractical.

Therefore, magnetic energy stored in each magnetic pole becomes large and it takes a long time to discharge and store the magnetic energy, so that it may have a high torque but low speed.

Particularly, in a case of a reluctance type motor having a large output torque, the number of magnetic poles of an armature becomes large and a gap in the magnetic path is small so that stored magnetic energy can be increased, and as a result, the above problem becomes more significant.

It becomes more difficult to solve the problem as the torque is made larger.

The second subject of this invention is as follows:

Since the reluctance type motor has no magnet on a rotor, no electric power is generated during the rotation. Therefore, it is impossible to obtain the electromagnetic braking force and no electromagnetic braking effect can be obtained. At the same time, no regenerative braking force can be obtained.

Therefore, it is difficult to use the reluctance type motor as a driving source for electric cars or a servomotor.

The third subject of this invention is as follows:

According to a general means, in order to prevent generation of counter torque, an energization width is set to be smaller than 180 electrical degrees by starting energization of the exciting coil before a salient pole starts to face a magnetic pole.

Therefore, since the time of interrupting the energization is delayed when the rotating operation is changed to the reverse rotation mode, reduced torque and counter torque are generated so as to change the torque characteristics in the forward and reverse rotation modes.

Accordingly, an object of this invention is to provide an inexpensive reluctance type electric motor of high output power and high speed which is capable of effecting the regenerative braking and is made simple in construction.

This invention is a two-phase reluctance type electric motor capable of effecting the regenerative braking, comprising a position detecting device for detecting positions of salient poles of a rotor by use of a plurality of position detection elements fixed on a fixed armature side with a preset separation angle and deriving an electrical signal having first, second, third and fourth position detection signals of a width of 90 electrical degrees which are cyclically generated to continue to one another without being superposed on one another; first semiconductor switching elements series-connected to both ends of first and second exciting coils and first and second exciting coils in a case where the first and first exciting coils and the second and second exciting coils respectively constitute first- and second-phase exciting coils; first diodes connected in a reverse direction to the series-connected bodies of the first semiconductor switching elements and the exciting coils; an energization control circuit for energizing the first semiconductor switching elements series-connected to both ends of the first, second, first and second exciting coils according to the first, second, third and fourth position detection signals to energize the exciting coils by means of a DC power source so as to rotate the motor in a forward direction or energizing the first semiconductor switching elements series-connected to the first, second, first and second exciting coils according to the two-phase position detection signals which cause reverse-rotation torque to energize the exciting coils by means of the DC power source so as to rotate the motor in a reverse direction; a detection circuit for deriving detection signals proportional to exciting currents flowing in the exciting coils; first and second chopper circuits for holding the exciting currents to preset values according to the detection signal outputs of the detection circuit; a second diode for reverse current prevention connected to the DC power source side; a second semiconductor switching element for short-circuiting connected in parallel with the second diode, the current conducting direction thereof being set to an opposite direction; an electric circuit for holding the second semiconductor switching element for short-circuiting in an OFF state for a period of time corresponding to a short time length of an electrical signal obtained at the end of each of the first, second, third and fourth position detection signals and holding the second semiconductor switching element in an ON state in the other period of time in response to the electrical signal; an electric circuit for preventing that magnetic energy stored in one of the exciting coils when energization of the corresponding exciting coil is interrupted at the end of a corresponding one of the position detection signals is fed back to the DC power source via the second diode of reverse current prevention connected in parallel with the second semiconductor switching element for short-circuiting, causing the stored magnetic energy to flow into the exciting coil to be energized by a next one of the position detection signals to rapidly extinguish the same and eliminating counter torque and reduced torque which are respectively generated by energization caused by discharge of the magnetic energy and energization caused from the starting portion of the position detection signal until the exciting current rises to a preset value; an electric circuit for making rise of current during the energization by the chopper circuit steeper by adding together the electromotive force caused by reduction in the amount of magnetic flux crossing the exciting coil and the DC power source voltage when the rotating operation is changed to a reverse rotation mode in the forward rotating operation and making fall of the DC power source voltage dull to effect the electromagnetic braking by supplying current to the positive side of the DC power source via the second semiconductor switching element for short-circuiting by a voltage obtained by adding together the electromagnetic force caused by reduction in the amount of flux crossing the exciting coil in the falling portion of current and the electromagnetic force caused by discharge of magnetic energy stored in the exciting coil so as to regenerate electric power; and means for adjusting and fixing the positions of the position detection elements so that energization of the exciting coil can be effected to make the output torque of the exciting coil maximum.

Further, this invention is a three-phase reluctance type electric motor capable of effecting the regenerative braking, comprising a position detecting device having three position detection elements disposed separately from one another by 120 electrical degrees, for detecting the positions of salient poles of a rotor to derive an A-phase position detection signal having first, second and third position detection signals which each have a width of 120 electrical degrees and are cyclically generated to continue to one another without being superposed on one another and fourth, fifth and sixth position detection signals of B phase of the same construction which have a phase difference of 60 electrical degrees with respect to the A-phase position detection signal and are cyclically generated; first semiconductor switching elements series-connected to both ends of A- and B-phase exciting coils when a first-phase exciting coil is constructed by first and first exciting coils, a second-phase exciting coil is constructed by second and second exciting coils, a third-phase exciting coil is constructed by third and third exciting coils, the first, second and third exciting coils are combined to constitute the A-phase exciting coil and the first, second and third exciting coils are combined to constitute the B-phase exciting coil;

first diodes connected in a reverse direction to the series-connected bodies of the first semiconductor switching elements and the exciting coils;

a first energization control circuit for energization control of the A-phase exciting coil and a second energization control circuit for energization control of the B-phase exciting coil, for cyclically energizing the first semiconductor switching elements series-connected to both ends of the A-phase exciting coil in response to the A-phase position detection signal to supply current to a corresponding one of the exciting coils from a DC power source, and cyclically energizing the first semiconductor switching elements series-connected to both ends of the B-phase exciting coil in response to the B-phase position detection signal to supply current to a corresponding one of the exciting coils from the DC power source so as to rotate the motor in a forward direction, or cyclically energizing the first semiconductor switching elements series-connected to both ends of the B-phase exciting coil in response to the A-phase position detection signal to supply current to a corresponding one of the exciting coils from the DC power source, and cyclically energizing the first semiconductor switching elements series-connected to both ends of the B-phase exciting coil in response to the A-phase position detection signal to supply current to a corresponding one of the exciting coils from the DC power source so as to rotate the motor in a reverse direction; first and second detection circuits for deriving first and second detection signals proportional to exciting currents flowing in the A-phase and B-phase exciting coils; first and second chopper circuits for holding the exciting currents in the A-phase and B-phase exciting coils at preset values; second and third diodes for reverse current prevention connected to the DC power source for supplying current to the first and second energization control circuits; second and third semiconductor switching elements for short-circuiting respectively connected in parallel with the second and third diodes and having current conducting directions set in the opposite direction; an electric circuit for holding the second and third semiconductor switching elements for short-circuiting in an OFF state for a short time length by electrical signals of the short time lengths obtained at the end of the A-phase and B-phase position detection signals and holding them in an ON state for the remaining period; an electric circuit for preventing that magnetic energy stored in one of the exciting coils when energization of the corresponding exciting coil is interrupted at the end of a corresponding one of the A-phase and B-phase position detection signals is fed back to the DC power source via the second or third diode of reverse current prevention connected in parallel with the second or third semiconductor switching element for short-circuiting, causing the stored magnetic energy to flow into a next one of the exciting coils to be energized by a next one of the position detection signals to rapidly extinguish the same, and eliminating counter torque and reduced torque which are respectively generated by energization caused by discharge of the magnetic energy and energization caused from the starting portion of the position detection signal until the exciting current rises to a preset value; an electric circuit for making rise of current during the energization by the chopper circuit steeper by adding together the electromotive force caused by reduction in the amount of magnetic flux crossing the exciting coil and the DC power source voltage when the rotating operation is changed to a reverse rotation mode in the forward rotating operation and making fall of the DC power source voltage dull to effect the electromagnetic braking by supplying current to the positive side of the DC power source via the second or third semiconductor switching element for short-circuiting by a voltage obtained by adding together the electromagnetic force caused by reduction in the amount of magnetic flux crossing the exciting coil in the falling portion of current and the electromagnetic force caused by discharge of magnetic energy stored in the exciting coil so as to regenerate electric power; and means for adjusting and fixing the positions of the position detection elements so that energization of the exciting coil can be effected to make the output torque of the exciting coil maximum.

Further, this invention is a three-phase half-wave reluctance type electric motor capable of effecting the regenerative braking, comprising a position detecting device including three position detection elements for deriving a position detection signal having first, second and third position detection signals which each have a width of 120 electrical degrees and are cyclically generated to continue to one another without being superposed on one another to detect the position of a rotor;

first-, second- and third-phase exciting coils wound on first-, second- and third-phase magnetic poles; first semiconductor switching elements series-connected to both ends of the first-, second- and third-phase exciting coils; first diodes connected in a reverse direction to series-connected bodies of the first semiconductor switching elements and the exciting coils; an energization control circuit for cyclically energizing the first semiconductor switching elements series-connected to both ends of the first, second and third exciting coils according to the first, second and third position detection signals to energize a corresponding one of the exciting coils by means of a DC power source so as to rotate the motor in a forward direction, or cyclically energizing the first semiconductor switching elements series-connected to the first, second, first and second exciting coils according to the three-phase position detection signals which cause reverse-rotation torque to energize the exciting coils by means of the DC power source so as to rotate the motor in a reverse direction; a detection circuit for deriving detection signals proportional to exciting currents flowing in the exciting coils; first and second chopper circuits for holding the exciting currents to preset values according to the detection signal outputs of the detection circuit; a second diode for reverse current prevention connected to the DC power source for supplying current to the energization control circuit; a second semiconductor switching element for short-circuiting connected in parallel with the second diode for reverse current prevention, the current conducting direction thereof being set in an opposite direction; an electric circuit for holding the second semiconductor switching element for short-circuiting in an OFF state only for a period of time corresponding to a short time length of an electrical signal obtained at the end of the three-phase position detection signals and holding the second semiconductor switching element in an ON state in the other period of time in response to the electrical signal; an electric circuit for preventing that magnetic energy stored in one of the exciting coils when energization of the corresponding exciting coil is interrupted at the end of a corresponding one of the three-phase position detection signals is fed back to the DC power source via the second diode of reverse current prevention connected in parallel with the second semiconductor switching element for short-circuiting, causing the stored magnetic energy to flow into the exciting coil to be energized by a next one of the position detection signals to rapidly extinguish the same, and eliminating counter torque and reduced torque which are respectively generated by energization caused by discharge of the magnetic energy and energization caused from the starting portion of the position detection signal until the exciting current rises to a preset value; an electric circuit for making rise of current during the energization by the chopper circuit steeper by adding together the electromotive force caused by reduction in the amount of magnetic flux crossing the exciting coil and the DC power source voltage when the rotating operation is changed to a reverse rotation mode in the forward rotating operation and making fall of the current dull to effect the electromagnetic braking by supplying current to the positive side of the DC power source via the second semiconductor switching element for short-circuiting by a voltage obtained by adding together the electromagnetic force caused by reduction in the amount of magnetic flux crossing the exciting coil in the falling portion of current and the electromagnetic force caused by discharge of magnetic energy stored in the exciting coil so as to regenerate electric power; and means for adjusting and fixing the positions of the position detection elements so that energization of the exciting coil can be effected to make the output torque of the exciting coil maximum.

According to this invention, since a large amount of magnetic energy stored in the exciting coil when current supply to the exciting coil is interrupted at the end of the position detection signal is prevented from being fed back to the power source side by means of the reverse current prevention diodes 100, 100a and 100b shown in FIGS. 6(a) and (b), the magnetic energy is forcedly caused to flow into the exciting coil to be next energized.

Therefore, extinction of the magnetic energy in the preceding stage exciting coil and storage of magnetic energy in the next stage exciting coil can be rapidly effected.

The time length therefor is approximately 20 microseconds in a motor with an output power of 300 Watts.

Therefore, an effect that a high speed (up to approximately 100,000 r.p.m.) is achieved while high torque characteristic is held can be attained.

The output torque can be increased by several times at a normal rotation speed if a plurality of magnetic poles usually used is provided.

Therefore, a problem treated as the first subject can be solved.

Since the chopper circuit is operated when the rotation operation is changed into the reverse rotation mode in the forward rotation operation, a voltage applied to the exciting coil becomes equal to the sum of the DC power source voltage and the counterelectromotive force to make rise of the exciting current steeper, and when the exciting current has reached a preset current value, energization is interrupted to make fall of the magnetic energy stored in the exciting coil dull, and in this period of time, an electric power is fed back to the power source by transistors connected in parallel with the diodes 100, 100a and 100b so as to regenerate the electric power.

Thus, the regenerative braking can be attained and the second subject can be solved.

In order to set the forward and reverse rotation modes, it is necessary to change the energization period of the exciting coil to be energized by the position detection signal from the forward torque generating period to the reverse torque generation period.

According to a means which is known in the art, a point at which the exciting coil is energized by the position detection signal is set to a point which comes before the salient pole starts to face the magnetic pole (which is disclosed in, for example, Japanese Patent Disclosure No. 53-126117) so that counter torque will be generated and torque ripples may be increased when the rotation speed is changed.

According to the means of this invention, energization is started when the salient pole is started to face the magnetic pole, or energization is effected only in a period in which it is set to face the central portion of the magnetic pole so that the above-described inconvenience can be eliminated.

Further, since it is constructed to provide a maximum torque in the above period, the output torque can be increased.

Thus, a problem treated as the third subject can be solved.

Since the speed of extinction and storage of magnetic energy in the exciting coil can be markedly enhanced by the action of the diode connected in the reverse direction to the power source side, a high output torque and high speed reluctance type motor can be obtained.

Further, forward and reverse rotations can be effected and the magnitudes of output torques generated in the forward and reverse rotations can be made equal to each other.

The regenerative braking can be effected to lower the speed. Further, if necessary, the regenerative braking can be effected to stop the motor.

Further, since the three-phase motor can be driven by controlling only the A- and B-phase exciting coils and the two-phase motor can be driven by controlling a single phase exciting coil, the control circuit can be made simple in construction.

BEST MODE OF CARRYING OUT THE INVENTION

Figure 1:
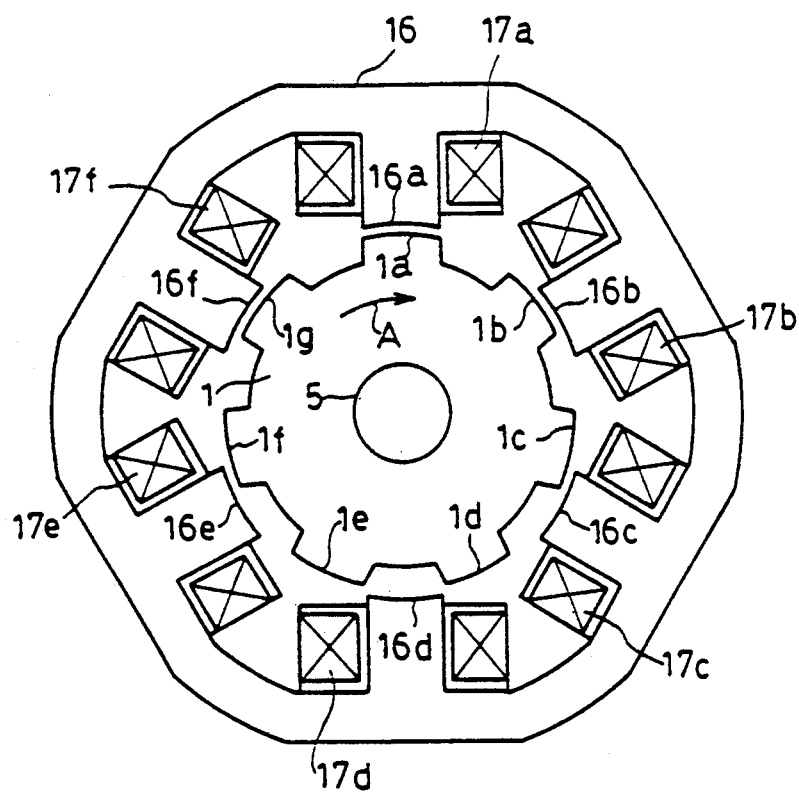
FIGS. 1a and 1b are explanatory views showing the construction of a three-phase reluctance type motor.
Figure 1:
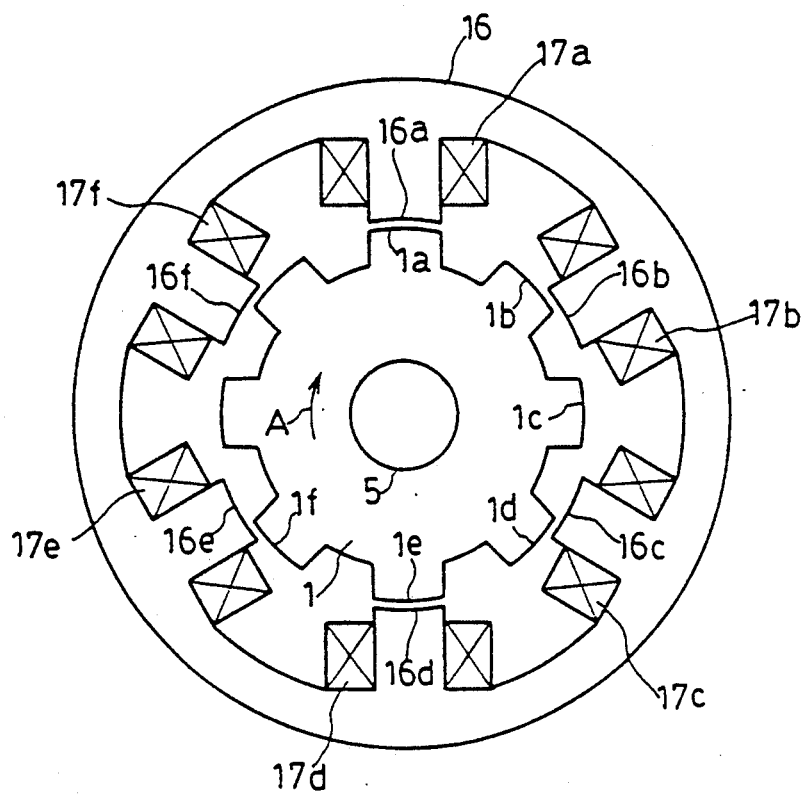

There will now be described an embodiment of this invention with reference to the accompanying drawings.

FIG. 1(a) shows an example of a three-phase reluctance type electric motor to which this invention is applied and is a plan view showing the construction of the salient poles of a rotor, the magnetic poles of a fixed armature and exciting coils.

In the description made below, the angle is indicated by an electrical angle.

The width of the salient poles 1a, 1b, . . . of the rotor 1 is 180 degrees and they are disposed at the same pitch with a phase difference of 360 degrees.

The rotor 1 is constructed by a well-known means having laminated silicon steel plates and includes a rotation shaft 5.

Magnetic poles 16a, 16b, 16c, 16d, 16e and 16f having a width of 180 degrees are disposed on a fixed armature 16 with an equal separation distance.

The width of the salient poles 1a, 1b, . . . and the width of the magnetic poles 16a, 16b, 16c, 16d, 16e and 16f are set to the same width of 180 degrees. The number of the salient poles is set to 7 and the number of the magnetic poles is set to 6.

Figure 3:
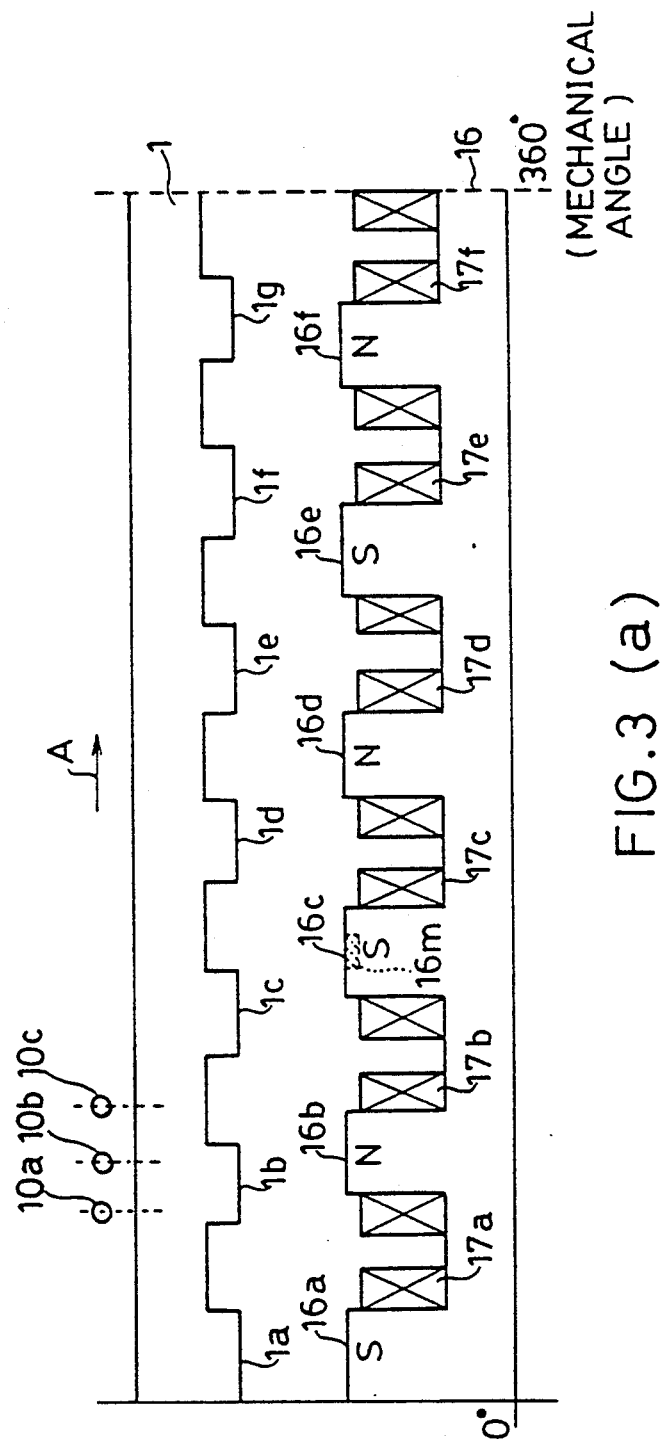
FIGS. 3a, 3b and 3c are developed views of rotors, magnetic poles and exciting coils of the three- and two-phase motors.
Figure 3:
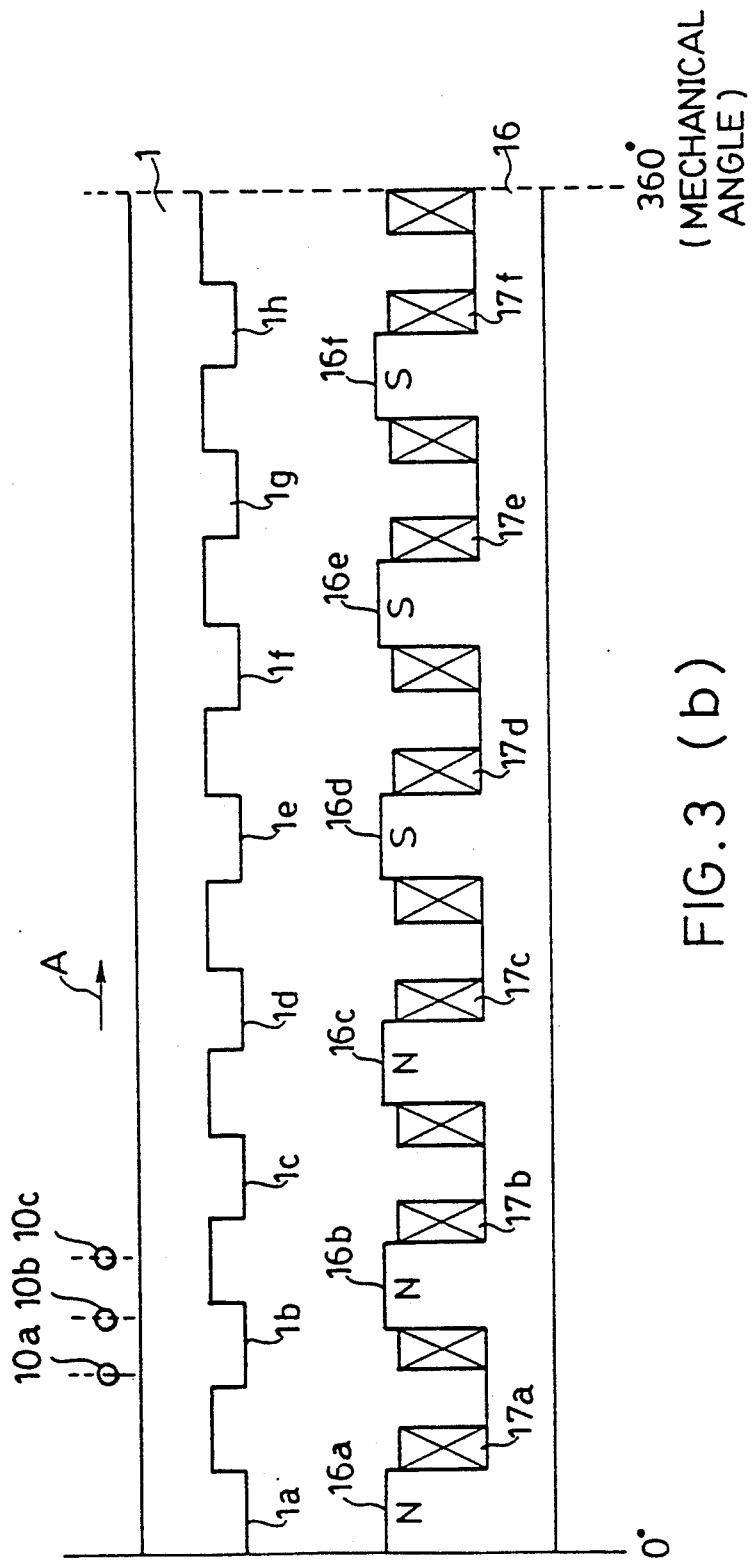
Figure 3:
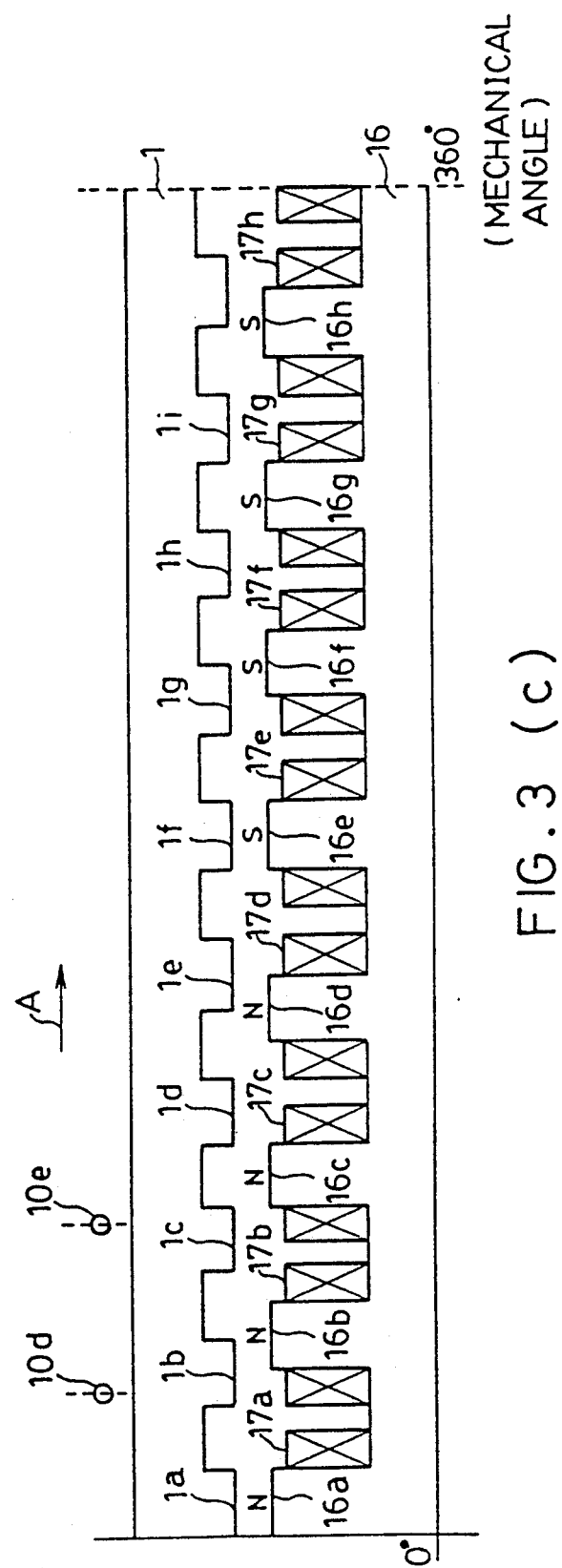

FIG. 3(a) is a developed view of a reluctance type three-phase motor shown in FIG. 1(a).

Coils 10a, 10b and 10c are position detection elements for detecting the positions of the salient poles 1a, 1b, . . . and are fixed on the side of the fixed armature 16 in the position shown in the drawing, and the coil face is set to face the side surface of the salient poles 1a, 1b, . . . with a gap provided therebetween.

The coils 10a, 10b and 10c are separated by 120 degrees.

The coils 10a, 10b and 10c are air-core coils having a diameter of 5 mm and approximately 100 turns.

Figure 4A:
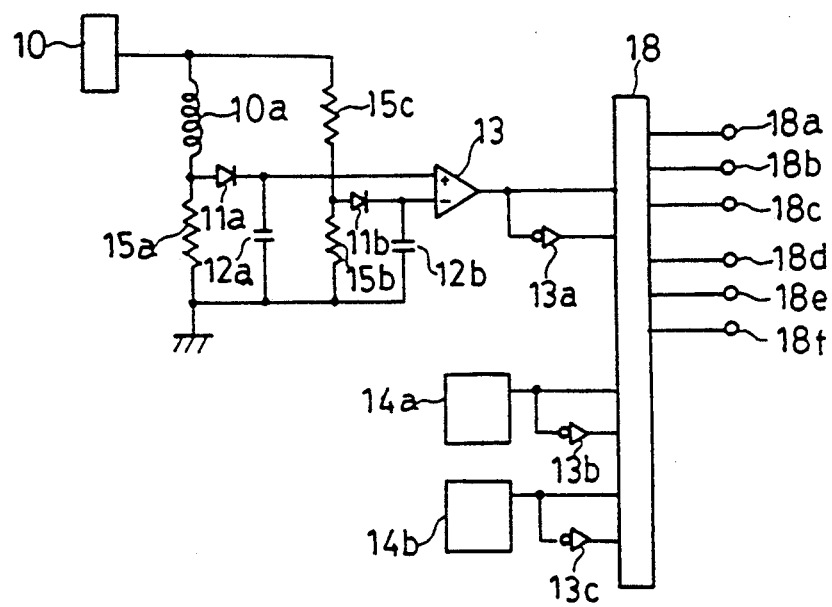
FIGS. 4a and 4b are diagrams of an electric circuit for deriving position detection signals by use of coils.

FIG. 4(a) shows a device for deriving a position detection signal by use of the coils 10a, 10b and 10c.

The coil 10a and resistors 15a, 15b and 15c constitute a bridge circuit which is set in balance when the coil 10a is not set to face the salient pole 1a, 1b, . . .

Therefore, the outputs of a low-pass filter constituted by a diode 11a and a capacitor 12a and a low-pass filter constituted by a diode 11b and a capacitor 12b are made equal to each other and the output of an operational amplifier 13 is set to a low level.

An oscillator 10 effects an oscillation of approximately 1 MHz.

When the coil 10a comes to face the salient pole 1a, 1b, . . . , the impedance is reduced by iron loss (eddy current loss and hysteresis loss) so that voltage drop across the resistor 15a may be increased and the output of the operational amplifier 13 may be set to a high level.

Figure 8A:
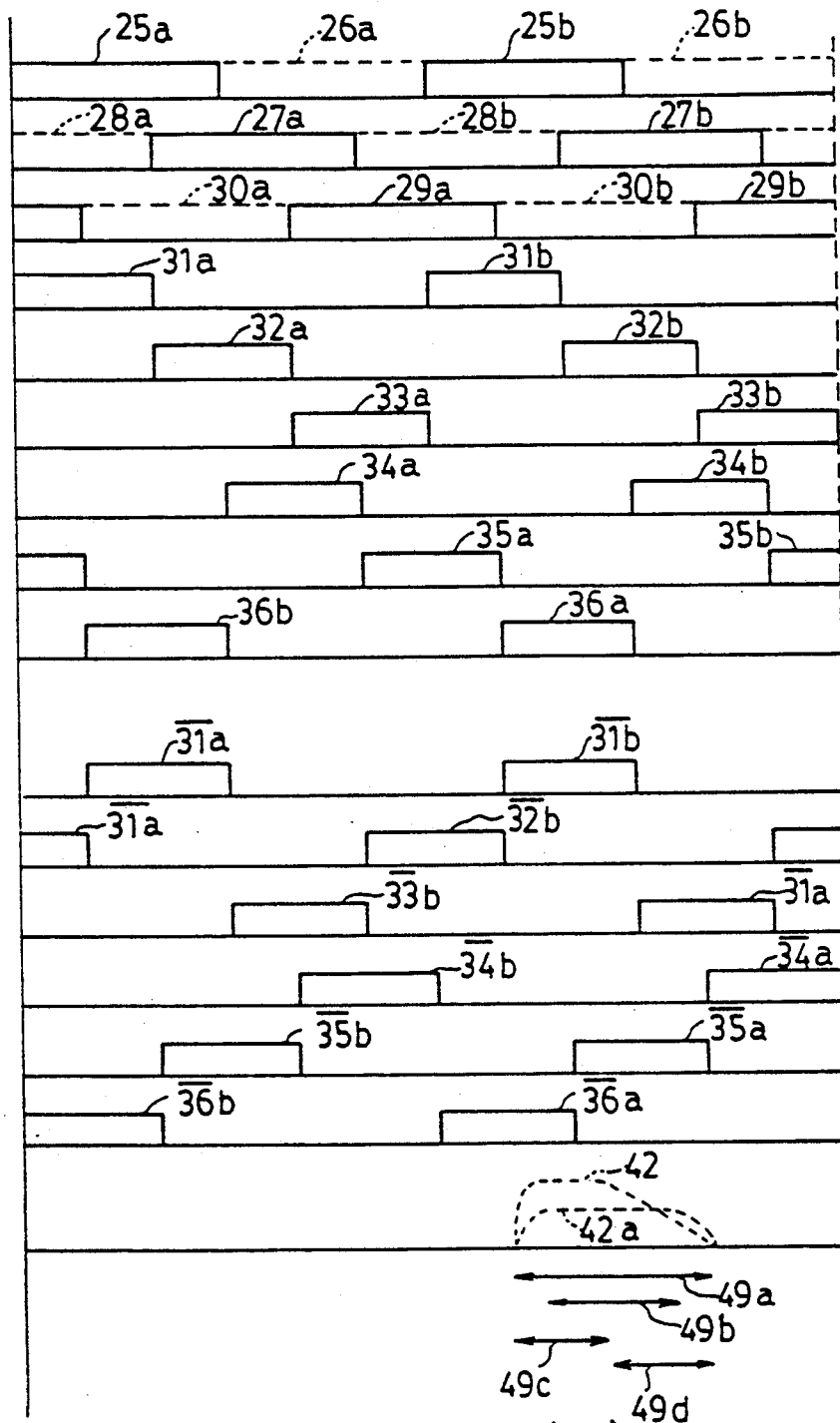
FIGS. 8a, 8b and 8c are timing charts of electrical signals at points in the circuit of FIG. 6.
Figure 8:
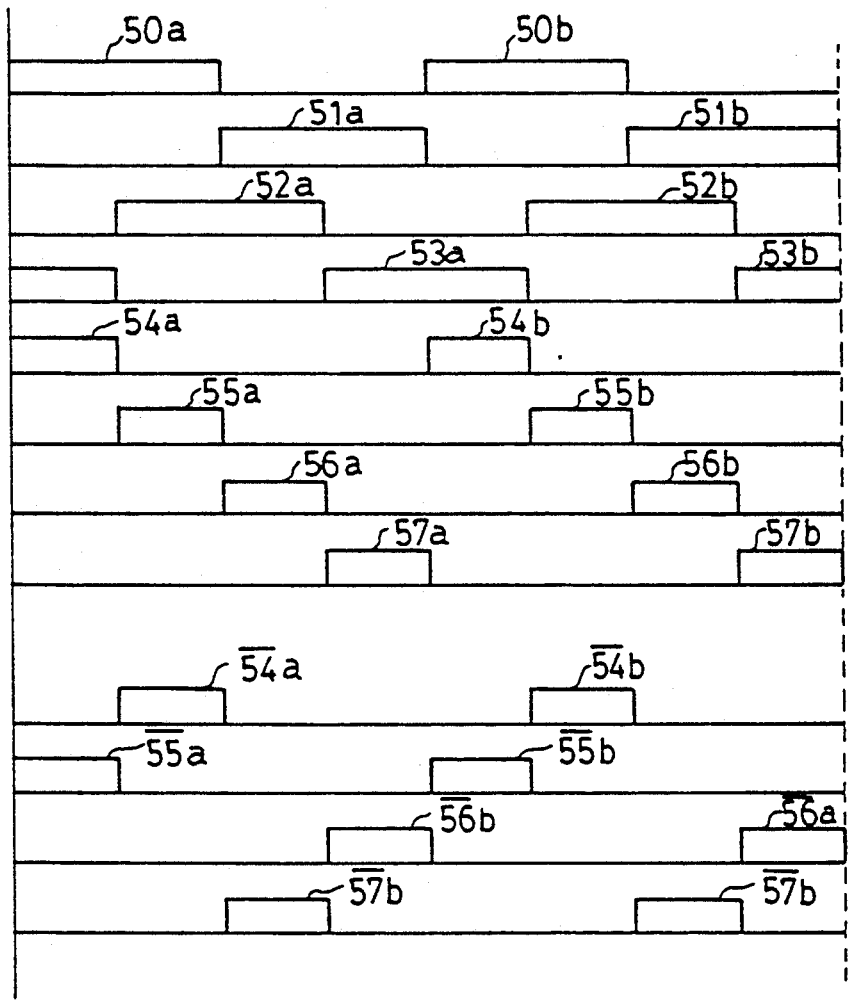
Figure 8:
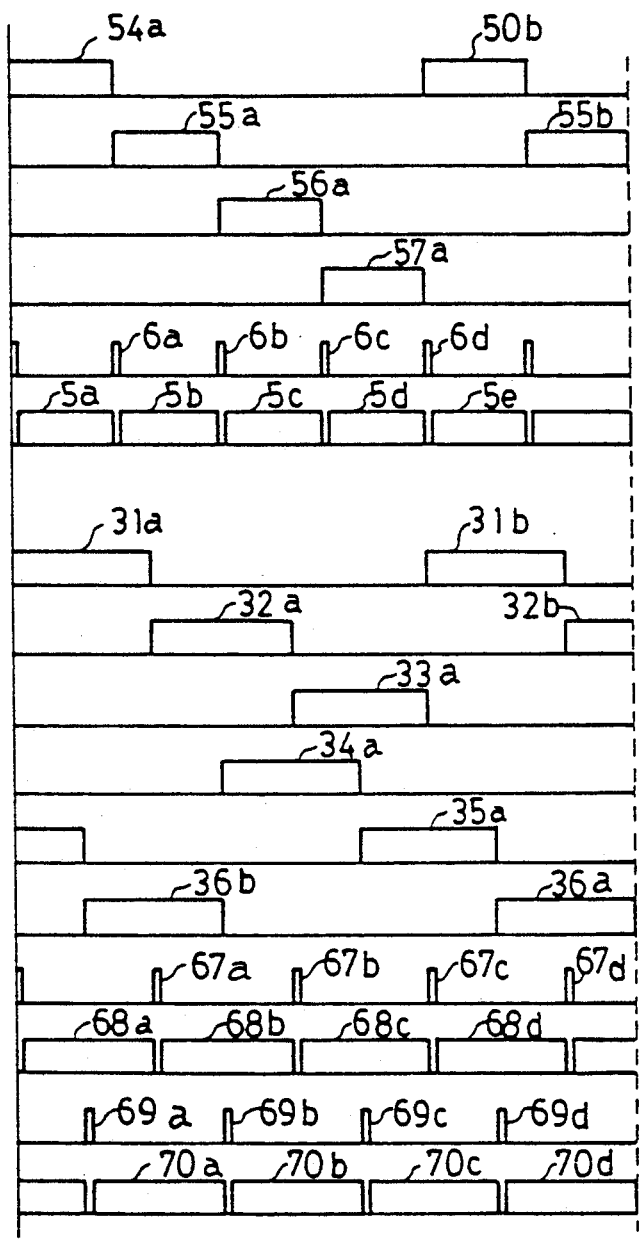

An input to a block circuit 18 is indicated by curves 25a, 25b, . . . in the timing chart of FIG. 8(a) and an input supplied via an inverter circuit 13a is indicated by dashed curves 26a, 26b, . . .

Block circuits 14a and 14b shown in FIG. 4(a) indicate the same construction as that of the above-described bridge circuit and respectively include coils 10b and 10c.

The oscillator 10 can be commonly used.

The outputs of the block circuit 14a and the inverter circuit 13b are input to the block circuit 18 and the output signals are indicated by curves 27a, 27b, . . . and dashed curves 28a, 28b, . . . in the timing chart shown in FIG. 8(a).

The outputs of the block circuit 14b and the inverter circuit 13c are input to the block circuit 18 and the output signals are indicated by curves 29a, 29b, . . . and dashed curves 30a, 30b, . . . in FIG. 8(a).

The curves 27a, 27b, . . . lag behind the curves 25a, 25b, . . . by 120 degrees and the curves 29a, 29b, . . . lag behind the curves 27a, 27b, . . . by 120 degrees.

The block circuit 18 is a circuit which is commonly used in the control circuit for a three-phase Y-type semiconductor motor and is a logic circuit for deriving electrical signals of rectangular waveform having widths of 120 degrees from the terminals 18a, 18b, . . . , and 18f in response to input of the above position detection signal. The outputs from the terminals 18a, 18b and 18c are indicated by curves 31a, 31b, . . . , curves 32a, 32b, . . . , and curves 33a, 33b, . . . in FIG. 8(a).

The outputs from the terminals 18d, 18e and 18f are indicated by curves 34a, 34b, . . . , curves 35a, 35b, . . . , and curves 36a, 36b. . .

The phase differences between the output signals of the terminals 18a and 18d, the output signals of the terminals 18b and 18e, and the output signals of the terminals 18c and 18f are 180 degrees.

The output signals of the terminals 18a, 18b and 18c are sequentially delayed by 120 degrees, and the output signals of the terminals 18d, 18e and 18f are sequentially delayed by 120 degrees.

Instead of the salient poles 1a, 1b, ... facing the coils 10a, 10b and 10c, aluminum plates of the same shape which rotate in synchronism with the rotor 1 shown in FIG. 1 can be used to attain the same effect.

The reluctance type motor has significantly large output torque but at the same time it has serious defects. These defects prevent the motor from being put into practice.

The first defect is that when the output torque is increased, that is, when the numbers of salient poles and magnetic poles are increased to increase the exciting current, the rotation speed will be significantly lowered.

In general, in the reluctance type motor, in order to increase the output torque, it is necessary to increase the numbers of salient poles and magnetic poles of FIG. 1(a) and make the gap therebetween small. If, at this time, the rotation number is set at a preset value, the inclination of rise of the exciting current is made relatively dull by magnetic energy stored in the magnetic poles 16a, 16b, ... and the salient poles 1a, 1b, ..., and time for extinction of discharge current due to the magnetic energy is relatively extended, and therefore large counter torque is generated.

In this circumstance, the peak value of the exciting current becomes small and the counter torque is generated so that the rotation speed will be lowered.

The number of times by which magnetic energy flows into and flows out of one magnetic pole in each rotation is significantly increased in comparison with a case wherein a well-known three-phase reluctance type motor is used and this also causes the rotation speed of the reluctance type motor to be lowered.

The second defect is that since it has no field magnet, the electromagnetic braking for deceleration or stop cannot be effected and the regenerative braking cannot be effected.

Therefore, it cannot be used as a servomotor or a motor for electric cars.

The third defect is that the output torque caused in a period of 180 degrees by the magnetic poles and salient poles is not generally symmetrical and cannot be proportional to the current. Therefore, the output torques at the times of forward and reverse rotations are made considerably different from each other and torque ripple may vary.

According to this invention, the above defects can be solved and the object can be attained by an exciting coil energizing control circuit which is simple in construction.

In FIG. 1(a) and the developed view of FIG. 3(a), a magnetic core 16 which is an annular portion and the magnetic poles 16a, 16b, ... are formed by a well-known means for laminating and fixing silicon steel plates and fixed on an outer casing so as to constitute an armature. The magnetic core 16 constitutes a magnetic path.

The magnetic core 16 and the magnetic poles 16a, 16b, ... constitute an armature.

The number of salient poles is seven and the salient poles are disposed with the same width and the same separation angle. The width of the magnetic poles 16a, 16b, ... is equal to the salient pole width and six magnetic poles are disposed with the same pitch.

When the exciting coils 17b and 17c are energized, the salient poles 1b and 1c are attracted and it is rotated in a direction of an arrow A.

When it is rotated through 30 degrees, energization of the exciting coil 17b is interrupted and the exciting coil 17d is energized so that torque may be generated by the salient pole 1d.

Each time the rotor 1 rotates through 60 degrees, the energization mode of the exciting coil is changed and the exciting polarities of the magnetic poles are cyclically changed such that the magnetic pole 16b (N pole) and magnetic pole 16c (S pole)→the magnetic pole 16c (S pole) and magnetic pole 16d (N pole)→the magnetic pole 16d (N pole) and magnetic pole 16e (S pole)→the magnetic pole 16e (S pole) and magnetic pole 16f (N pole)→the magnetic pole 16f (N pole) and magnetic pole 16a (S pole), and a three-phase reluctance type motor in which the rotor 1 is driven in the direction of the arrow A can be obtained.

Since two magnetic poles to be excited are set to have different polarities, leakage magnetic fluxes passing through non-excited magnetic poles are set in the opposite direction to each other, thereby preventing generation of counter torque.

In order to further reduce the above leakage flux, two first-phase magnetic poles 16a are used as one set and respectively magnetized to the N and S poles by energizing the armature coils for the magnetic poles. The leakage fluxes of the two magnetic poles are canceled by the other magnetic poles and thus the leakage flux is extinguished.

Every two of the other magnetic poles 16a, 16b, ..., and 16f also constitute one set and are magnetized to the N and S poles. The same effect can be attained and the leakage flux can be extinguished. In this case, the number of salient poles 1a, 1b, ... is eleven.

Next, the construction of a two-phase reluctance type motor to which this invention is applied is explained.

Figure 2:
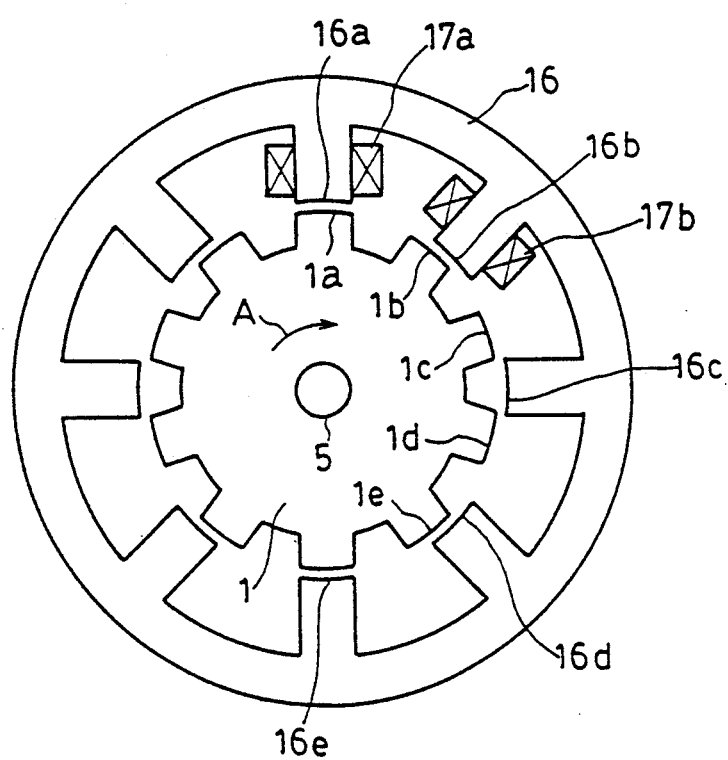
FIG. 2 is an explanatory view showing the construction of a two-phase reluctance type motor.

FIG. 2 is a construction view and FIG. 3(c) is a developed view thereof.

A magnetic core 16 which is an annular portion and magnetic poles 16a, 16b, ... are formed by a well-known means for laminating and fixing silicon steel plates and fixed on an outer casing (not shown) so as to constitute an armature. The magnetic core 16 constitutes a magnetic path.

Exciting coils 17a, 17b, ... are wound on the magnetic poles 16a, 16b, ...

The salient poles 1a, 1b, ... are mounted on the outer peripheral portion of the rotor 1 and disposed to face the magnetic poles 16a, 16b, ... with a gap of approximately 0.1 to 0.2 mm set therebetween.

The rotor 1 is also constituted by the same means as the armature 16.

The number of salient poles is 10 and the separation angles between the salient poles are equal to each other. The width of the magnetic poles 16a, 16b, ... is set to be equal to that of the salient pole and eight salient poles are arranged at the same pitch.

When the magnetic poles 17b and 17f are energized, the salient poles 1b and 1g are attracted and it rotates in a direction of arrow A.

When it is rotated through 90 degrees, energization of the exciting coils 17b and 17f is interrupted and exciting coils 17c and 17g are energized so that torque will be generated by the salient poles 1c and 1h.

The magnetic poles 16b and 16c are magnetized to the N pole and the magnetic poles 16f and 16g are magnetized to the S pole. Magnetization of the above poles is effected to prevent magnetic flux from being leaked to generate counter torque.

In the next rotation of 90 degrees, the magnetic poles 16d and 16h are magnetized to the N and S poles as shown in the drawing.

In the next rotation of 90 degrees and in the succeeding rotation of 90 degrees, respective magnetic poles are magnetized to the corresponding magnetic polarities as shown in the drawing.

The rotor 1 rotates in the direction of arrow A by the above excitation and acts as a two-phase motor.

The width between the magnetic poles is set to be 1.5 times the width of the salient pole.

Further, since a space in which the magnetic poles are mounted is large, thick electric wires can be used and the effect that copper loss can be reduced to enhance the efficiency can be attained.

Since the reluctance type motor has no field magnet, it becomes necessary to increase the magnetic flux generated by the magnetic poles by the corresponding magnetic flux. Therefore, it is important to set the large space between the magnetic poles.

The number of salient poles shown in FIG. 3(c) is 10 and is larger than that of the well-known salient poles of this type. Therefore, counter torque is generated by discharge of magnetic energy stored in each magnetic pole by excitation and the output torque becomes large, but the rotation speed is lowered, making it impossible to put it into practical use.

However, according to the means of this invention, the above inconveniences can be eliminated and only the effect that the output torque can be increased can be additionally attained. The detail explanation therefor is made later.

In FIG. 6(b), exciting coils K and L respectively indicate the exciting coils 17a and 17e and the exciting coils 17b and 17f shown in FIG. 3(c), and the two exciting coils are connected in series or in parallel.

Transistors 22a and 22b and transistors 22c and 22d are connected to both ends of the exciting coils K and L.

The transistors 22a, 22b, 22c and 22d are semiconductor switching elements but may be the other semiconductor elements having the same effect.

Electric power supply is effected by means of DC power source terminals 2a and 2b.

When an electrical signal of high level is input via a terminal 41a, the transistors 22a and 22b are turned on to energize the exciting coil K. When an electrical signal of high level is input via a terminal 41b, the transistors 22c and 22d are turned on to energize the exciting coil L.

Figure 4B:
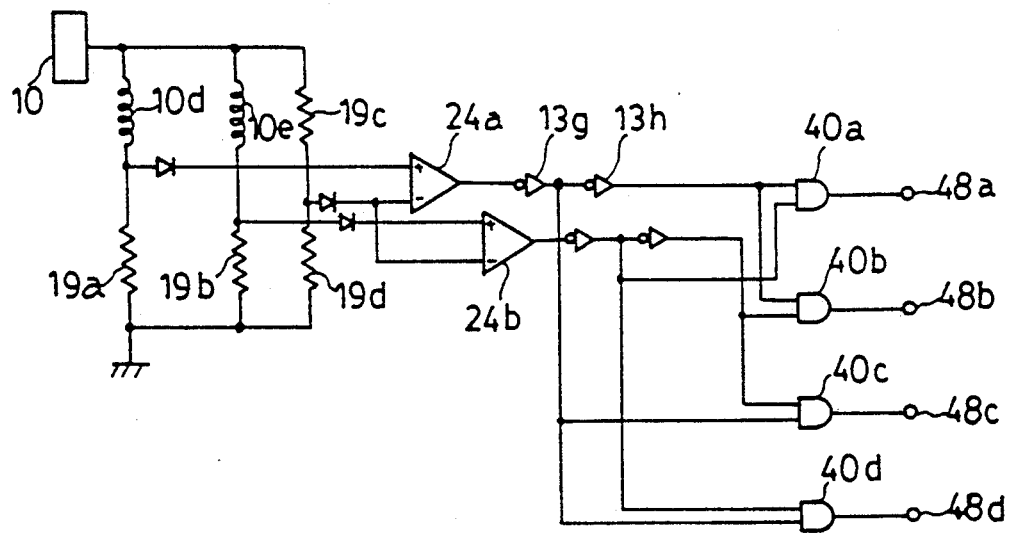

Coils 10d and 10e shown in FIG. 4(b) are formed with the same construction as that of the coils 10a, 10b and 10c, disposed to face the side surface of the salient poles 1a, 1b, . . . and used to derive position detection signals.

Next, a means for receiving position detection signals input via the terminals 41a and 41b is explained with reference to FIG. 4(b).

The coils 10d and 10e are fixed on the fixed armature 16 in positions shown in FIG. 3(c). The frequency of an oscillator 10 is approximately 1 MHz.

The coils 10d and 10e and resistors 19a, 19b, 19c and 19d constitute a bridge circuit, and when the coils 10d and 10e are set to face the salient poles 1a, 1b, . . . , the bridge circuit is set in balance and two inputs to the operational amplifiers 24a and 24b become equal to each other.

The above inputs are rectified into a DC form by diodes. If smoothing capacitors 12a and 12b shown in FIG. 4(a) are additionally provided, complete rectification can be attained, but they are not always necessary. If the capacitors are omitted, it is advantageous for circuit integration.

An output of the operational amplifier 24a caused by the coil 10d is inverted twice by means of inverter circuits 13g and 13h and input to AND circuits 40a and 40b.

The input signals take a rectangular waveform and are shown by curves 50a, 50b, . . . in FIG. 8(b). An output of the operational amplifier 24b is a position detection signal caused by the coil 10e, and is inverted by means of two inverter circuits and input to the AND circuits 40b and 40c.

The input signals are indicated by curves 52a, 52b, . . .

The coils 10d and 10e are separated from each other by (360+90) degrees. Therefore, the phase difference between the curves 50a, 50b, . . . and the curves 52a, 52b, . . . is 90 degrees.

An output (input to the lower side terminal of the AND circuits 40c and 40d) derived from a point between the inverter circuits 13g and 13h is indicated by curves 51a, 51b, . . .

An input to the lower side terminal of the AND circuit 40a and an input to the upper side terminal of the AND circuit 40d are indicated by curves 53a, 53b, . . .

An output from a terminal 48a of the AND circuit 40a is only a portion in which the curves 50a, 50b, . . . and the curves 53a, 53b, . . . are superposed one on the other and is indicated by curves 54a, 54b, . . . which have a width of 90 degrees and separated from each other by 360 degrees.

Output signals from output terminals 48b, 48c and 48d of the AND circuits 40b, 40c and 40d are indicated by curves 55a, 55b, . . . , curves 56a, 56b, . . . and curves 57a, 57b, . . . for the same reason.

The reason why the two inverter circuits 13g and 13h shown in FIG. 4(b) are used is explained later.

The above-described position detection signals are used in a circuit of FIG. 6(b). The detail explanation therefor is made below.

Block circuits B and C are circuits for controlling energization of an exciting coil M (series circuit or parallel circuit of the exciting coils 17c and 17g) and an exciting coil N (series circuit or parallel circuit of the exciting coils 17d and 17h) and have the same construction as that for the exciting coil K.

Position detection signals input to the terminals 41a, 41b, 41c and 41d are electrical signals indicated by curves 54a, 54b, . . . and curves on the three lower rows of FIG. 8(b).

Figure 6A:
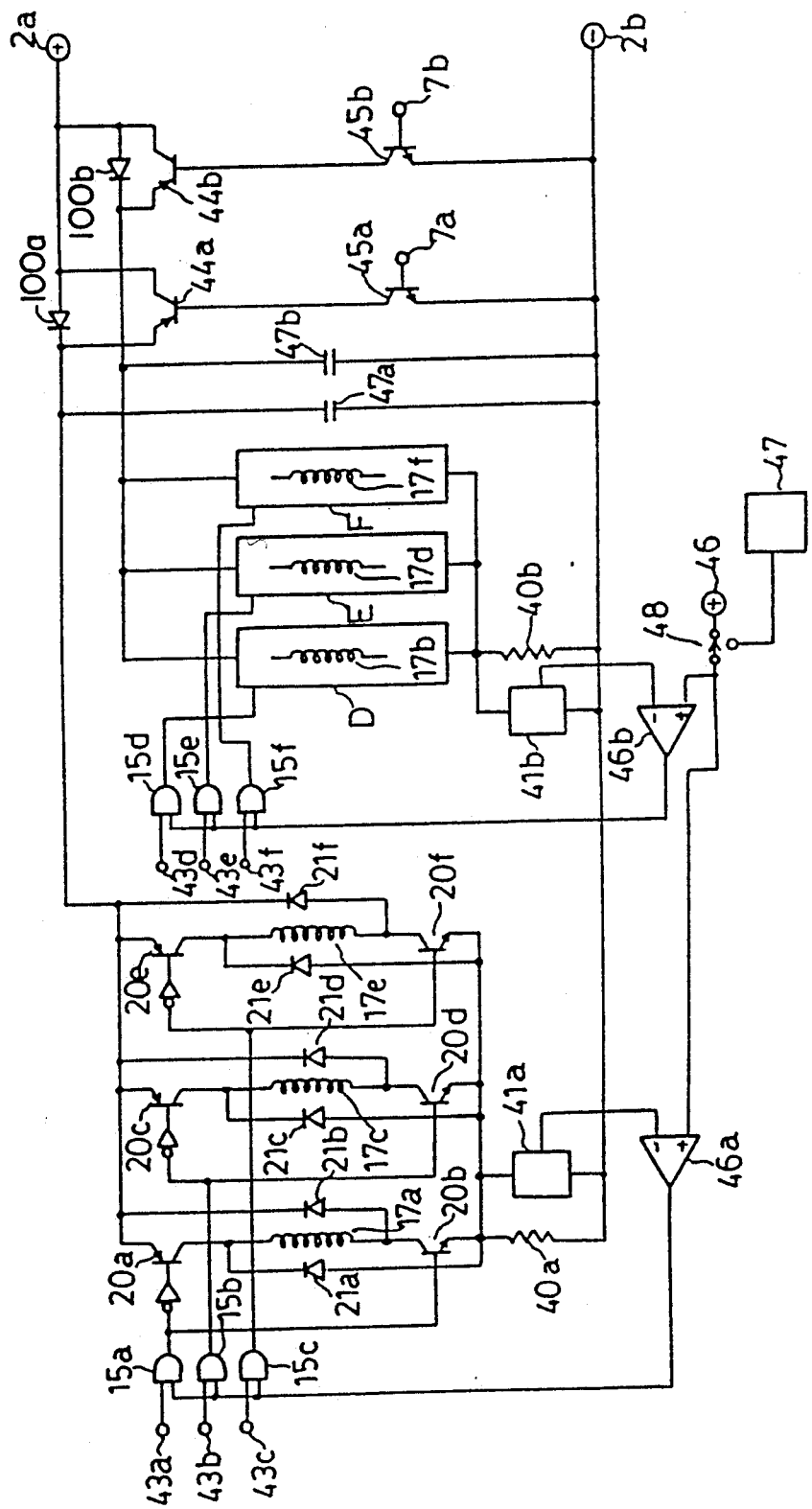
FIGS. 6a, 6b, 6c and 6d are diagrams of an energization control circuit for the exciting coils.
Figure 6:
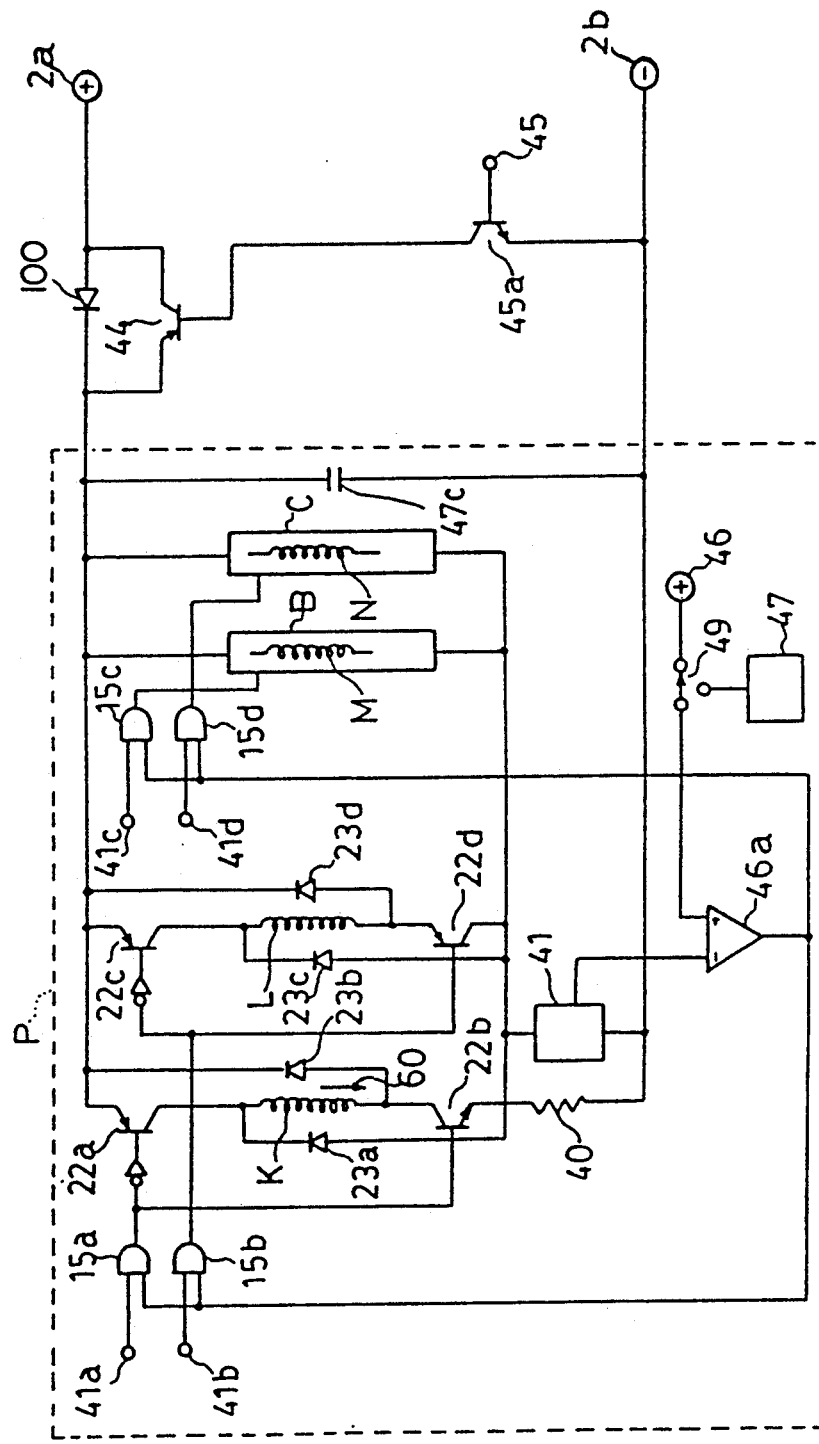
Figure 6:
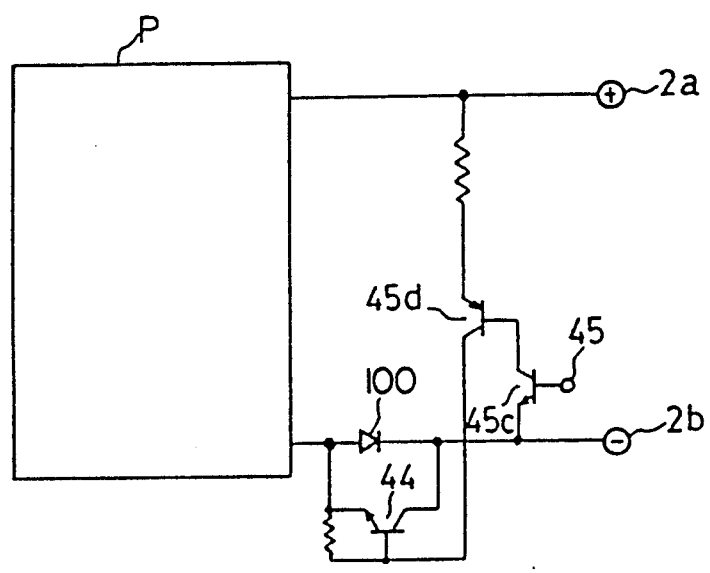
Figure 6:
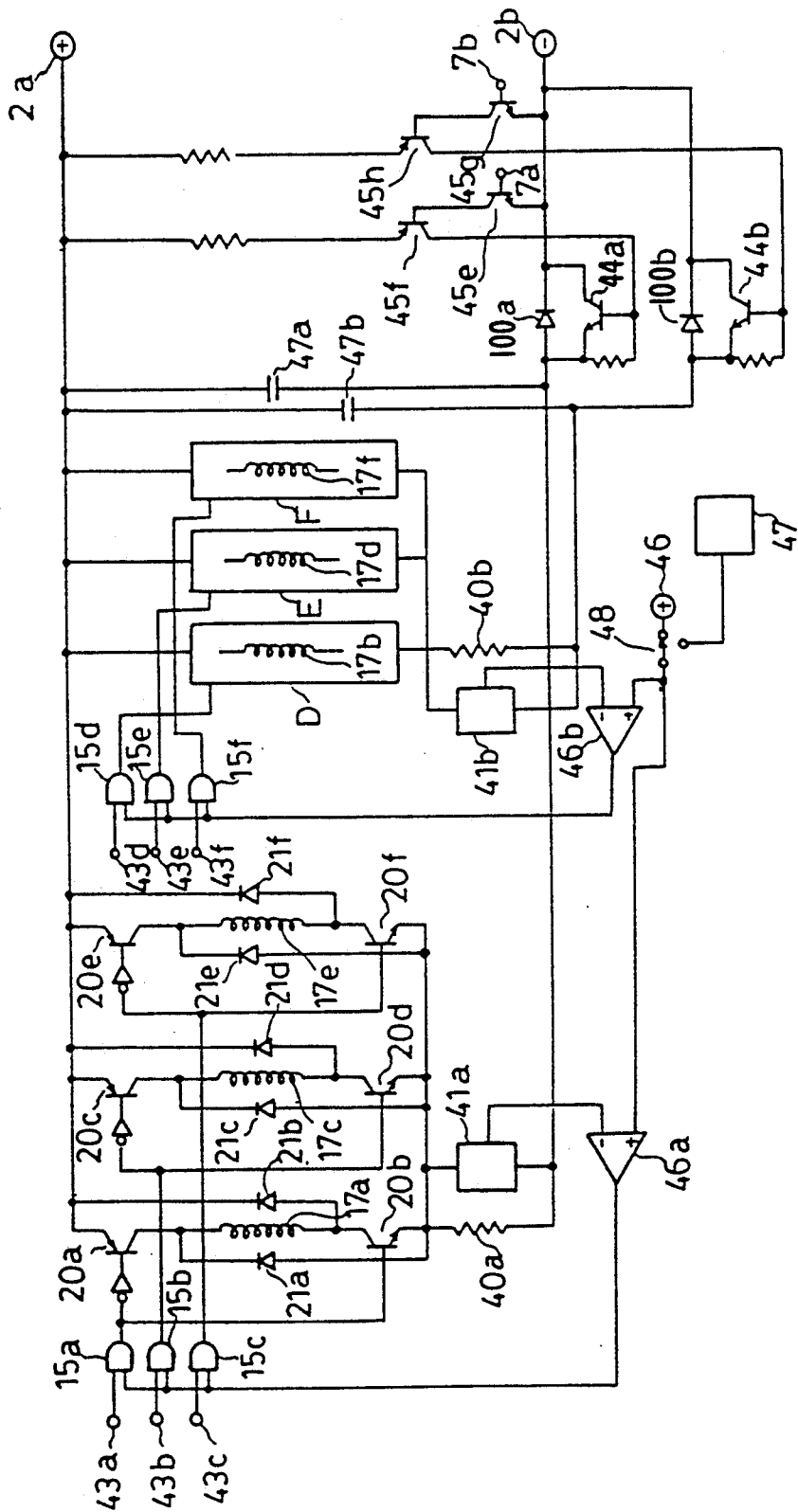
Figure 7:
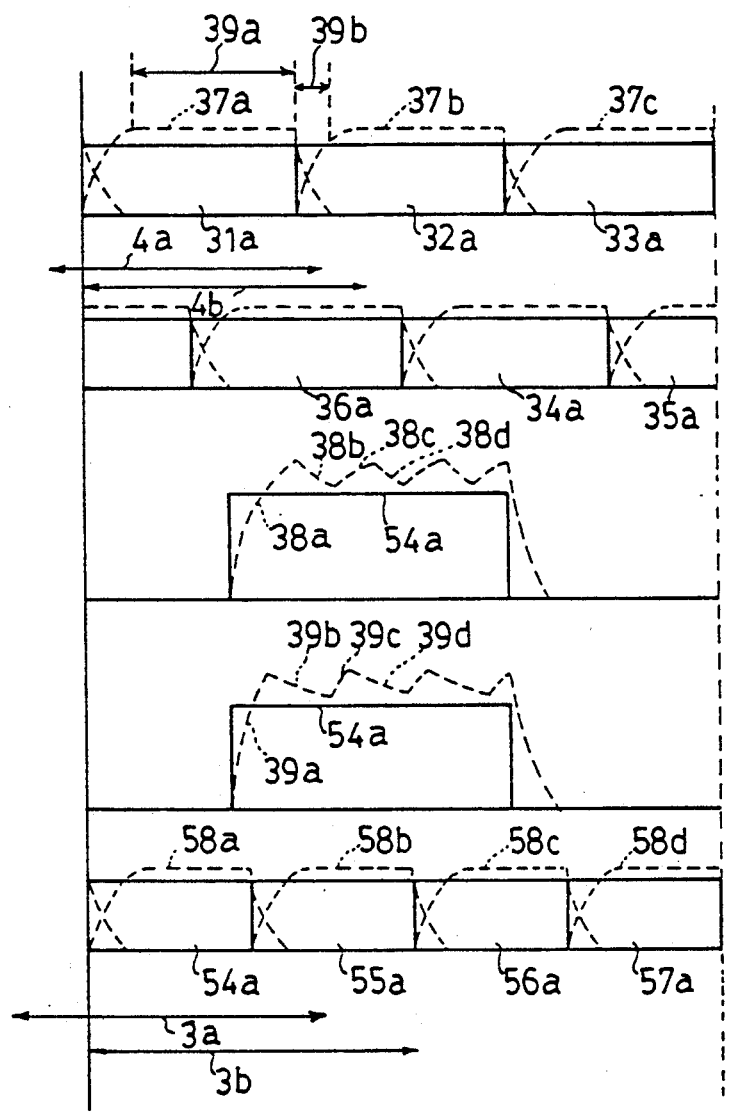
FIG. 7 is a timing chart of the position detection signals and exciting currents.

The position detection signals input to the terminals 41a, 41b, 41c and 41d of FIG. 6(b) are indicated by curves 54a, 55a, 56a and 57a in the timing chart of FIG. 7.

When an electrical signal of the curve 54a is input to the terminal 41a, the exciting coil K is energized and an exciting current flows as shown by broken lines 58a.

At the end of the curve 54a, the transistors 22a and 22b are turned off and magnetic energy stored in the exciting coil K is discharged as shown by the end portion of the broken lines 58a. When the period of the discharge current becomes long and exceeds 45 degrees, counter torque is generated.

Further, since an electrical signal indicated by a curve 55a is input to the terminal 45b, the exciting coil L is energized. If rise of the rising current is delayed, reduced torque is generated.

As described above, if the periods of the falling portion and rising portion are long, a problem that the counter torque and reduced torque will be generated occurs.

An arrow 3a in FIG. 7 indicates a width of 180 degrees and positive torque is generated in this period. Therefore, if the width of the falling portion at the end of the broken lines 58a exceeds 45 degrees, counter torque is generated.

In this case, the position of the position detection element is adjusted such that the curve 54a will be set at the central portion of the arrow 3a, and fixed on the armature side.

If the fixed position of the position detection element is adjusted such that energization of the exciting coil may be started when the salient pole starts to face the magnetic pole, the energization period is set to have a width indicated by the curve 54a and the period in which positive torque is generated has a width indicated by an arrow 3b and is 180 degrees.

When the high-speed operation is effected, the periods of the position detection signal curves 54a, 54b, ... become short and the widths of the rising portion and falling portion of the exciting current will not vary.

Therefore, it is necessary to reduce the widths of the rising portion and falling portion. The means therefor is explained below.

In FIG. 6(b), since the transistors 22a and 22b are turned off at the end of the position detection signal 54a which is an input to the terminal 41a, magnetic energy stored in the exciting coil K tends to be discharged and flow into the power source terminal 2a via the diodes 23a and 23b, but this is prevented by a reverse current prevention diode 100.

Since, at this time, the position detection signal 55a is input to the terminal 41b, the transistors 22c and 22d are set in the conductive state.

Therefore, the interrupted magnetic energy causes a high voltage and flows into the exciting coil L so as to make the rise of the exciting current steep and make extinction of the magnetic energy or fall of the exciting current rapid.

According to the actual measurement, the periods of rising and falling currents are approximately 20 microseconds in the case of a motor of an output power of 300 watts. Therefore, no counter torque is generated at a rotation speed of 100,000 r.p.m. and thus a high rotation speed can be attained.

A capacitor 47c is not always necessary but may be used to protect the transistors when there is a slight time difference between switching times of the transistors 22a, 22b, ... It may be approximately 0.1 micro-farad.

In a non-high speed operation, if the capacitance of the capacitor 47c is increased to increase the period of the falling portion of the exciting current, output torque is increased. Further, generation of vibration can be suppressed.

Even at the time of energization of the exciting coils M and N in a case where electrical signals of the position detection signal curves 56a and 57a are input to the terminals 41c and 41d shown in FIG. 6(b), the periods of the rising portion and falling portion of the exciting current (indicated by broken lines 58c and 58d) are reduced and generation of the counter torque and reduced torque can be suppressed.

The energization controlling circuit of FIG. 6(b) has a feature that the construction thereof can be simplified in comparison with that of an energization controlling circuit of a well-known two-phase reluctance type motor. This is because the position detection signal curves 54a, 54b, ... are continuous.

If there is a gap in the boundary portion (indicated by thick lines in FIG. 7) between the curves 54a, 54b, ..., exciting current cannot be conducted at the time of energization and the starting operation becomes unstable.

A means for eliminating the above gap is the inverter circuits 13g and 13h as described before with reference to FIG. 4(b).

Since the diameter of the coils 10d and 10e has a finite value, the rising and falling portions of the output signals of the operational amplifiers 24a and 24b may be inclined, and as a result, gaps may occur in the boundary portions between the curves 54a, 54b, ... if the inverter circuits 13g and 13h are omitted and when a rectangular wave output of position detection signal is subjected to the logical process.

The above defects can be eliminated by using the inverter circuits 13g and 13h.

An operational amplifier 46a, absolute-value circuit 41 (circuit for rectifying the voltage drop across the resistor 40), AND circuits 15a and 15b and the like shown in FIG. 6(b) constituted a chopper circuit and it is explained below.

The position detection signal 54a input to the terminal 41a is enlarged and shown by the same symbol in the third row of FIG. 7. A portion indicated by broken lines 38a is a rising portion of the exciting current of the exciting coil K.

When the exciting current increases and the voltage drop across the resistor 40 or an output of the absolute-value circuit 41 exceeds a voltage at the + terminal of the operational amplifier 46a or a voltage of a reference voltage source 46, an output of the operational amplifier 46a is set to a low level and an output of the AND circuit 15a is also set to a low level, thereby turning off the transistors 22a and 22b. Therefore, the exciting current flows such that magnetic energy may be fed back to the power source via the diode 23b, transistor 44, power source and diode 23a. The curve is shown by broken lines 38b in FIG. 7. When it is reduced to a preset value, an output of the operational amplifier 46a is set to a high level by the hysteresis characteristic of the operational amplifier 46a and the transistors 22a and 22b are turned on to increase the exciting current as shown by broken lines 38c.

When it is increased to a preset value, an output of the operational amplifier 46a is again set to the low level and the transistors 22a and 22b are turned off.

The chopper operation for repeatedly effecting the above cycles is effected and the transistors 22a and 22b are rendered nonconductive at the end portion of the curve 54a so that the exciting current will be rapidly reduced. The same chopper operation as described above is effected for the remaining exciting coils.

The value of the exciting current is controlled by a voltage of the reference voltage source 46 and the output torque is also controlled.

Since the operation of feeding the magnetic energy back to the power source side is prevented by the diode 100, a transistor 44 is used. The transistor 44 is used to short-circuit the diode 100 and feed the magnetic energy back to the power source side.

Next, an energization controlling means of the transistor 44 is explained.

In the timing chart of FIG. 8(c), curves 54a, 54b, ... , curves 55a, 55b, ..., curves 56a, ... and curves 57a, ... are position detection signals indicated by the same symbols in FIG. 8(b).

Each position detection signal is differentiated by a differentiating circuit and a differentiating pulse is converted to have a specified width by means of a monostable circuit and the width is set to be substantially equal to the width of the falling portion of the energization current of the exciting coil.

The electrical signals are indicated by symbols 6a, 6b, ... The electrical signals are inverted by inverter circuits and the inverted signals are indicated by curves 5a, 5b, ...

The electrical signals indicated by the symbols 5a, 5b, ... are input to the terminals 45 of FIG. 6(b), the transistors 45a and 44 are set in the conductive state in the period (in which the afore-mentioned chopper circuit is operated) corresponding to the width of the curves 5a, 5b, ...

Since input to the terminal 45 is interrupted at the end of the position detection signal curve, the transistors 45a and 44 are turned off.

The nonconductive period is set to be the widths indicated by the curves 6a, 6b, ...

At this time, magnetic energy stored in the exciting coil is prevented from being fed back to the power source by means of the diode 100 since the transistor 44 is set in the nonconductive state. Therefore, it causes a high voltage and flows into an exciting coil to be next energized so as to make the rise of the exciting current rapid.

According to the actual measurement, the widths of the falling portion of current flowing in the preceding stage exciting coil and the rising portion of current flowing in the succeeding stage exciting coil are set to approximately 20 micro-seconds as described before.

Therefore, a motor with high efficiency can be obtained in which no counter torque is generated in the high-speed rotating operation.

One of the features of this invention is that since magnetic energy of the salient pole and magnetic pole stored by the exciting coil generates a large electromotive force when it is extinguished, the energization of the exciting coil to be next energized can be made rapid by use of the electromotive force.

Since conversion of the magnetic energy is not rapidly effected by setting the power source voltage to a high voltage, the power source voltage may be set to overcome the counter-electromotive force as in an ordinary DC motor. Therefore, a feature that a low voltage, for example, a battery can be used as the power source can be obtained.

Since the magnetic poles 16a and 16e of FIG. 3(c) are simultaneously excited, the magnetic attraction forces (acting in the radial direction and having no relation with the output torque) between them and the salient poles are set in balance, thereby giving no impact on the bearings and consequently suppressing occurrence of mechanical sounds.

Since those of the other magnetic poles which lie in symmetrical positions are excited, the same effect can be obtained.

Further, since the period in which the magnetic pole is excited exceeds 90 degrees as is seen from exciting current curves 58a, 58b, 58c and 58d of FIG. 7, the magnetic attraction forces between the adjacent magnetic poles in the radial direction are superposed. Therefore, occurrence of the mechanical sound can be suppressed.

In order to change the rotation direction, input signals to the terminals 41a, 41b, 41c and 41d may be respectively input to the terminals 41c, 41d, 41a and 41b. For this purpose, a switching circuit becomes necessary but it is omitted and not shown in the drawing.

In the reverse rotation mode, the exciting current control can be effected in the same manner as in the forward rotation mode.

However, when the rotation mode is changed to the reverse rotation mode in the forward rotating operation, large impact sound may be generated and the exciting coil may be burned. This is because the direction of the counter-electromotive force of a to-be-excited coil coincides with the energization direction when the reverse rotation mode is set and a large exciting current flows.

In the device of this invention, the exciting current may be kept at a preset value by the chopper function even when the reverse rotation mode is set and therefore the above problem will not occur.

Thus, the rotation speed can be reduced by setting the reverse rotation mode in the forward rotation operation and the deceleration torque can be changed by suppressing a voltage of the reference voltage source 46.

Therefore, it can be used as a servomotor or a driving source for electric cars.

In a well-known reluctance type motor, energization is started before the salient pole is set to face the magnetic pole in order to prevent occurrence of counter torque. If this type of motor is reversely rotated, the output torque is considerably reduced and a torque ripple is increased and it cannot be practically used.

In this embodiment, since the exciting coil is energized when the salient pole has come to face the magnetic pole by 45 degrees in the reverse rotation operation, the output torque will be kept constant in the forward and reverse rotation operations and thus the above defects can be eliminated.

Since the reluctance type motor has no field magnet, no means for electromagnetically braking the rotor 1 when the power source is interrupted is provided.

Next, a means for eliminating the above defects is explained. A block circuit 47 shown in FIG. 6(b) is a well-known circuit for generating voltage which is proportional to the rotation speed by detecting the rotation speed.

In a case where the reverse rotation mode is set while the forward rotation mode is set, an interlocking electric switch 49 is also switched.

Therefore, an input to the + terminal of the operational amplifier 46a is given by an output voltage of the speed detection circuit 47.

In the reversely rotating mode, since the motor is decelerated and the input voltage to the + terminal of the operational amplifier 46 is lowered, the reverse torque is also reduced.

As a result, the same electromagnetic braking effect as that obtained in the case wherein the armature coil of a DC motor is short-circuited is generated and the motor is stopped.

At the time of stop, the input voltage to the + terminal of the operational amplifier 46 is extinguished, and therefore the output torque is also extinguished and the motor is stopped. In order to start the motor again, the electric switch 49 may be returned to the original position.

In the case of a motor having a large output power, the regenerative braking is effected and it is necessary to feed motion energy of the rotor and load back to the power source.

Next, a means therefor is explained.

The construction is made such that the object of decelerating or stopping the motor in the forward rotation mode can be attained by setting the reverse rotation mode.

Now, the exciting coil K set in the reverse rotation mode is explained, and in this case, the counter-electromotive force is generated in a direction of an arrow 60 and a voltage applied to the exciting coil K is set to be equal to (V+E). V denotes a voltage between the terminals 2a and 2b, and E denotes a counter-electromotive force or an electromotive force caused by reduction in the amount of the magnetic flux crossing the exciting coil K with rotation of the motor.

Therefore, exciting currents are rapidly increased as indicated by broken lines 39a, 39c, . . . by a position detection signal indicated by a curve 53a in the fourth row of the timing chart of FIG. 7.

When the exciting current increases to a preset value, an output of the operational amplifier 46a is set to the low level, and consequently the transistors 22a and 22b are turned off so that the direction of energization by magnetic energy stored in the exciting coil K and that of the counter-electromotive force may be set in the same direction.

In the forward rotation operation, the above-mentioned energization direction is set in the opposite direction, but since braking torque is generated to set the reverse rotation mode, the energization direction is set in the same direction.

Therefore, current flowing via the diodes 23a and 23b causes stored magnetic energy to be fed back to the power source via the transistor 44 by a voltage of (V+E) so that the rate of the energization current to decrease becomes smaller than in the case of the forward rotation operation, thereby increasing the width of the falling portion.

Therefore, it varies as shown by broken lines 39b and 39d of FIG. 7. When it is reduced to a preset value, an output of the operational amplifier 46a is set to the high level by the hysteresis characteristic thereof to turn on the transistors 22a and 22b again, thereby rapidly increasing the exciting current.

Thus, a chopper circuit for repeatedly effecting the above cycle can be obtained. The operation and effect of the diodes 23a, 23b, . . . transistor 44 and diode 100 at the starting portion and end portion of each position detection signal are exactly the same as those obtained in the case of the forward rotation operation.

The width of the broken lines 39a, 39c, . . . of FIG. 7 is set to be smaller than that of the broken lines 39b, 39d, . . .

Electric power is dissipated in the period of the broken lines 39a, 39c, . . . , but the period thereof is short and the power consumption is small.

In the period of the broken lines 39b, 39d, . . . , energy of the rotor and load is converted into electric power and fed back to the power source. Since the period thereof is long, the effect of effecting the regenerative braking can be obtained.

If the operation is returned to the forward rotation operation when preset deceleration is completed, the normal forward rotation driving operation can be set.

For example, approximately 300,000 r.p.m. can be attained by increasing the voltage to be applied.

When it is used as a servomotor, the output torque can be increased to by several times with the rotation speed of approximately 300,000 r.p.m. and an effective means can be attained by use of a well-known means for increasing the number of salient poles 1a, 1b, . . . of FIG. 3(c) by several times and disposing teeth having the same width as that of the salient pole in those portions of the magnetic poles 16a, 16b, . . . which face the salient poles.

The transistor 44 and diode 100 of FIG. 6(b) are provided on the positive polarity side 2a of the power source, but they can be provided on the negative polarity side 2b of the power source to attain the same purpose.

A portion surrounded by broken lines P is shown by the same symbol in FIG. 6(c).

Since stored magnetic energy is prevented from flowing in the left direction by means of the reverse current prevention diode 100 when energization of the exciting coil is interrupted at the end of the position detection signal, it flows into an exciting coil to be next energized so as to make rise of the exciting current rapid, thereby making it possible to rapidly extinguish the magnetic energy of the preceding stage exciting coil.

Since an electric signal indicated by the curves 5a, 5b, . . . of FIG. 8(c) is input to the terminal 45, the transistors 45c, 45d and 44 are set in the conductive state when it is set at the high level.

Therefore, the transistor 44 is set in the nonconductive state only in a preset period of time at the end portion of the position detection signal and set in the conductive state in the other period of time so that the same operation and effect as in the case of FIG. 6(b) can be attained.

Next, output torque obtained by means of the magnetic and salient poles in a period of 180 degrees is explained.

In the timing chart of FIG. 8(a), curves 42 and 42a on the bottom row indicate output torque of an arrow 49a (180 degrees).

When the exciting current is small, the output torque is symmetrical as shown by the curve 42a and a flat torque characteristic can be obtained.

When the exciting current becomes large and the magnetic flux approaches the saturation value, an asymmetrical torque curve will be obtained as shown by the curve 42. That is, when the salient pole starts to face the magnetic pole, the torque is rapidly increased, becomes flat and is then gradually decreased.

When the exciting current is further increased, the flat portion almost disappears.

In the forward and reverse rotation modes described before, the output torque characteristic in the forward and reverse rotation operations will not be changed if the torque curve is symmetrical (curve 42a) at the time of energization of the exciting coil with a width of 90 degrees at the central portion thereof.

However, if it is asymmetrical, the output torque characteristic will be changed.

Figure 9:
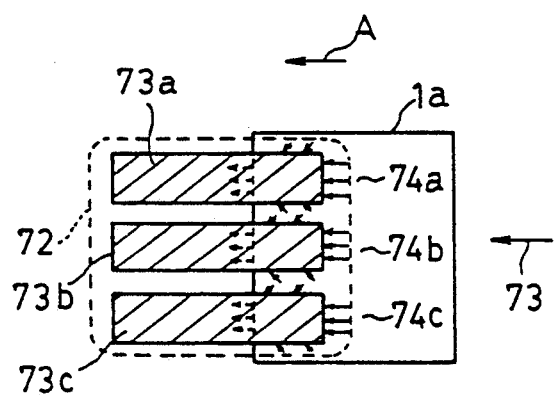
FIGS. 9a and 9b are explanatory views illustrating generation of output torque by means of an exciting coil.
Figure 9:
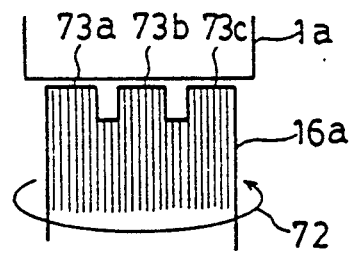

A means for solving the above problem is shown in FIGS. 9(a) and (b).

FIG. 9(b) is a view obtained when viewing FIG. 9(a) in the direction of an arrow 73, for illustrating the output torque generated by the salient pole 1a and magnetic pole 16a.

A portion of the magnetic pole 16a which faces the salient pole is divided into three portions 73a, 73b and 73c.

When the salient pole 1a travels in a direction of arrow A and starts to face the right end portion of the magnetic poles 73a, 73b and 73c, only the output torque indicated by arrows 74a, 74b and 74c and arrows indicated on the left side thereof is obtained.

When it further travels and comes to a position indicated in the drawing, output torques indicated by arrows on both sides of each magnetic pole are added. As it travels further, the torque becomes larger and the torque on the latter half (right side) of the torque curve 42 in FIG. 8(a) increases, thereby making the output torque curve substantially symmetrical. Thus, the above problem can be solved.

Next, a means for setting the output torques equal in the forward and reverse rotation operations even if the output torque curve is asymmetrical is explained.

In this case, energization is effected over a width of 90 degrees from a point at which the salient pole starts to face the magnetic pole as indicated by an arrow 49c of FIG. 8(a) in the forward rotating operation, and energization is effected in the reverse rotating operation over a period indicated by an arrow 49d, that is, a width of 90 degrees from a point at which the salient pole starts to face the magnetic pole.

Therefore, it becomes necessary to use different position detection signals in the forward and reverse rotating operations.

As described before, electrical signals indicated by curves 54a, 54b, . . . , curves 55a, 55b, . . . , curves 56a, 56b, . . . and curves 57a, 57b, . . . are input to the terminals 41a, 41b, 41c and 41d for forward rotation.

In order to set the reverse rotation mode, curves 54a, 54b, . . . (which are the same as the curves 55a, 55b, . . . ) are input to the terminal 41c.

Further, curves 55a, 55b, . . . (which are the same as the curves 54a, 54b, . . . ) are input to the terminal 41d.

Further, curves 56a, 56b, . . . (which are the same as the curves 57a, 57b, . . . ) are input to the terminal 41a.

Further, curves 57a, 57b, . . . (which are the same as the curves 56a, 56b, . . . ) are input to the terminal 41b.

Figure 5A:
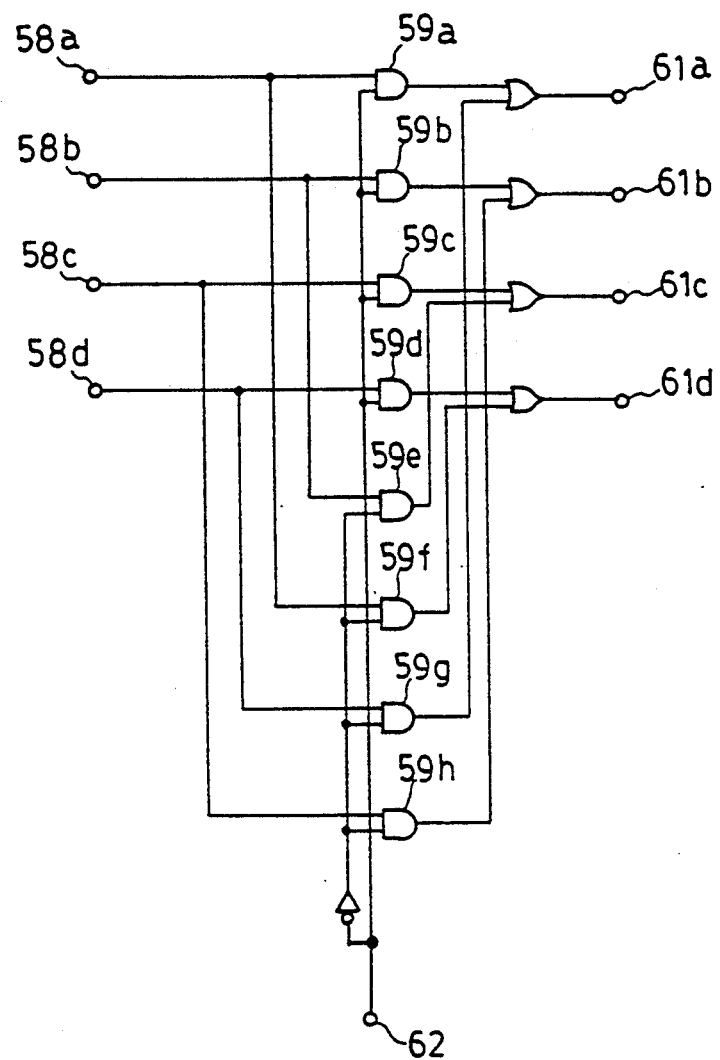
FIGS. 5a and 5b are diagrams of a logic processing circuit for position detection signals for changing the rotation direction.
Figure 5:
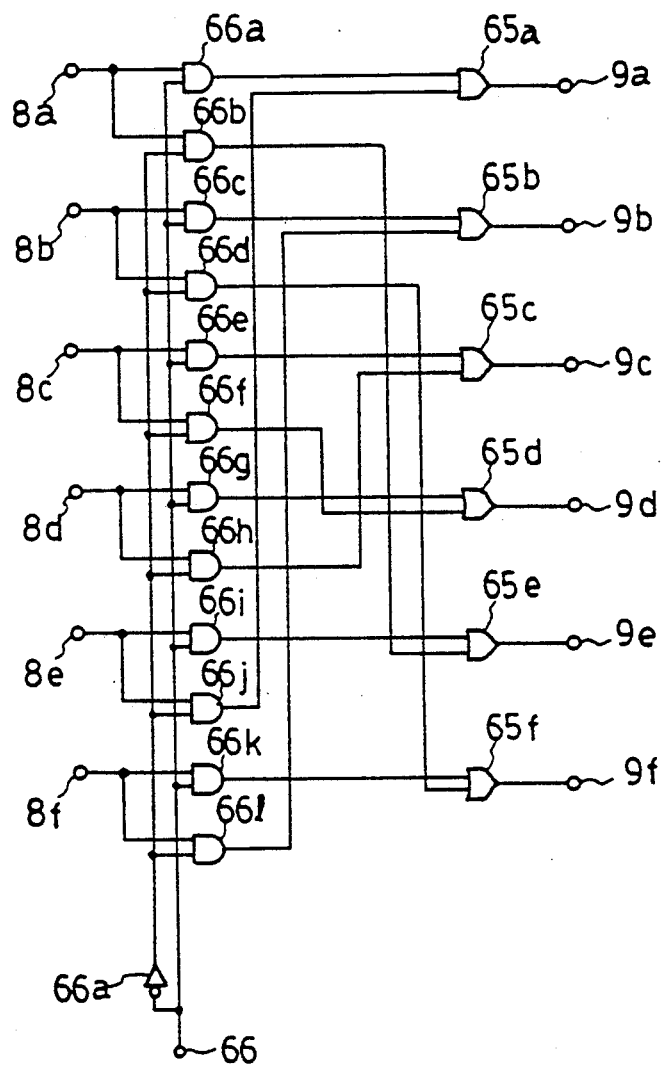

The above-described forward and reverse rotation controlling circuit is shown in FIG. 5(a).

Inputs to the terminals 58a, 58b, 58c and 58d are electrical signals indicated by the curves 54a, 54b, . . . and curves on the succeeding rows in FIG. 8(b).

Outputs of terminals 61a, 61b, 61c and 61d are respectively input to the terminals 41a, 41b, 41c and 41d of FIG. 6(b).

When an input to the terminal 62 is at the high level, output signals are derived from AND circuits 59a, 59b, . . . , and 59d and outputs of the terminals 58a, 58b, . . . , and 58d are input to the terminals 41a, 41b, . . . , and 41d of FIG. 8(b) so that the motor will rotate in a forward direction.

When an input to the terminal 62 is set to the low level, output signals are derived from AND circuits 59e, 59f, 59g, and 59h and outputs of the terminals 61a, 61b, 61c, and 61d are obtained as indicated by the curves 57a, 57b, . . . , the curves 56a, 56b, . . . , the curves 55a, 55b, . . . and the curves 54a, 54b, . . . so that the motor will rotate in a reverse direction.

The fixed position of the position detection element is set to attain the above object and is fixed on the armature side.

An input to the terminal 45 of FIG. 6(b) must be switched to be equal to an inverted form of a differential pulse occurring at the end of the curves 54a, 54b, . . . and three electrical signals on the succeeding rows of FIG. 8(b).

Next, a means for applying the same concept as that of FIG. 6(b) to a three-phase motor is explained with reference to FIG. 6(a).

A case wherein the three-phase motor shown in FIGS. 1(a) and 3(a) is driven as a three-phase motor by use of the circuit shown in FIG. 6(a) is explained.

In FIG. 6(a), transistors 20a and 20b, transistors 20c and 20d, and transistors 20e and 20f are respectively connected to both ends of exciting coils 17a, 17b and 17c. The transistors 20a, 20b, 20c, . . . function as switching elements, and other switching elements having the same effect may be used instead of the transistors.

Electric power is supplied via the positive and negative terminals 2a and 2b of the DC power source.

When a position detection signal at the high level is input via the terminal 43a, the transistors 20a and 20b are turned on to energize the exciting coil 17a. When position detection signals at the high level are input via the terminals 43b and 43c, the transistors 20c and 20d and transistors 20e and 20f are turned on to energize the exciting coils 17b and 17c. Block circuits D, E and F are energization control circuits for the exciting coils 17b, 17d and 17f and formed with the same construction as that of the energization control circuit for the exciting coil 17a.

Therefore, when position detection signals at the high level are input via the terminals 43d, 43e and 43f, the exciting coils 17b, 17d and 17f are energized.

The terminal 46 is used as a reference voltage source for specifying the exciting current. The output torque can be changed by changing the voltage of the terminal 46.

Absolute-value circuits 41a and 41b are circuits for rectifying voltages proportional to voltage drops or exciting currents in the resistors 40a and 40b and outputs thereof are input to one-side terminals of operational amplifiers 46a and 46b.

Curves 31a, 32a, 33a, 36a, 34 and 35a of FIG. 7 indicate the curves of the same symbols of FIG. 8(a). Electrical signals indicated by the curves 31a, 32a and 33a of FIG. 7 are input to the terminals 43a, 43b and 43c.

When a signal is input to the terminal 43a, the transistors 20a and 20b are turned on to energize the exciting coil 17a, and when an exciting current is increased to a preset value, an input voltage to one terminal of the operational amplifier 46a exceeds that of the + terminal so that an output thereof will be set to the low level, thereby setting an output of the AND circuit 15a to the low level.

Then, the transistors 20a and 20b are turned off and magnetic energy stored in the exciting coil tends to be fed back to the DC power source terminals 2a and 2b via the diodes 21b and 21a.

At this time, since the transistor 44a is set in the conductive state, the above feedback operation is effected.

The reason for this is explained later.

Therefore, the current rapidly decreases and when it is reduced to a preset value, the output of the operational amplifier 46a is set to the high level by the hysteresis characteristic thereof so that the transistors 20a and 20b may be turned on to start energization of the exciting coil 17a. When the current is increased to a preset value, an input of the operational amplifier 46a is set to the low level so that the transistors 20a and 20b will be turned off and the current will decrease.

Thus, a chopper circuit for cyclically effecting the above energization can be obtained.

Since an output of the AND circuit 15a extinguishes at the end of the curve 31a, energization of the exciting coil 17a is interrupted.

In this case, magnetic energy stored in the exciting coil 17a is prevented from being fed back to the power source side by the reverse current prevention diode 100a. At this time, the transistor 44a is kept in the nonconductive state.

The transistors 20c and 20d are turned on by the position detection signal curve 32a of FIG. 7 at the same time that the transistors 20a and 20b are turned off.

Therefore, the magnetic energy stored in the exciting coil 17a causes a high voltage and flows into the exciting coil 17c, thereby making rise of the current rapid and causing the current in the exciting coil 17a to be rapidly extinguished.

Since the magnetic energy may be transferred from the preceding stage exciting coil 17a to the succeeding stage exciting coil 17c by use of the large energy thereof, time for energy transfer can be significantly reduced even when the magnetic energy is large or the output torque is large.

The capacitor 47a is not always necessary, but it can be used to protect the transistors 20a, 20b, . . . when a difference occurs in switching times of the respective transistors. The capacitance of the capacitor 47a is approximately 0.1 micro-farad.

In the rotation speed of approximately 3000 r.p.m. which is not high-speed rotation, it is advantageous that the capacitance of the capacitor 47a is set to be larger than a value specified above and is set to a largest possible value in a range in which occurrence of the counter torque can be prevented.

This is because the eddy current loss in the iron loss can be reduced and occurrence of vibration can be suppressed.

The above-described energization is indicated by broken lines 37a in FIG. 7. A pulsating current flows in the period shown by the arrow 39a but it is omitted in the drawing. Since a signal of the curve 32a is input to the terminal 43b, the exciting coil 17c is energized by the transistors 20c and 20d, AND circuit 15b and operational amplifier 46a in the same manner as indicated by the broken lines 37b.

Next, a signal of the curve 33a is input to the terminal 43c, and energization indicated by the broken lines 37c is effected by the transistors 20c and 20d, AND circuit 15c and operational amplifier 46a in the same manner. The width of the arrow 39b is the width of the falling portion and rising portion of the broken lines 37a and 37b, and counter torque and reduced torque are generated when the width exceeds 30 degrees.

The exciting current flows as indicated by the broken lines when the position detection signals 36a, 34a and 35a are input to the terminals 43d, 43e and 43f and takes the same form as described before.

The former is referred to as energization of the A-phase exciting coil and the latter is referred to as energization of the B-phase exciting coil.

The chopper action by the operational amplifier 46b, AND circuits 15d, 15e and 15f is effected in the same manner as described before and the operation and effect thereof are also the same.

The operation and effect by the reverse current prevention diode 100b and transistor 44b can be effected in entirely the same manner as described in the case of the A-phase exciting coil.

Next, the operation of controlling the conduction state of the transistor 44a is explained.

The curves 31a, 31b, . . . and electrical signals on the succeeding rows of FIG. 8(a) are indicated by the same symbols in FIG. 8(c).

Each of the above curves is differentiated by a differentiation circuit and a differential pulse at the end thereof is converted to an electrical signal having a preset width by a monostable circuit. The electrical signals are indicated as electrical signals 67a, 67b, . . . The inverted forms of the electrical signals obtained by inverter circuits are indicated by curves 68a, 68b, . . .

Further, the curves 34a, 34b, . . . and electrical signals on the succeeding rows of FIG. 8(a) are indicated by the same symbols in FIG. 8(c).

Each of the above curves is differentiated by a differentiation circuit and a differential pulse at the end thereof is converted to an electrical signal having the same width as the electrical signal 67a by a monostable circuit and are indicated as electrical signals 69a, 69b, . . . The inverted forms of the electrical signals obtained are indicated by curves 70a, 70b, . . .

The electrical signals 68a, 68b, . . . are input to the terminal 7a of FIG. 6(A), the electrical signals 70a, 70b, . . . are input to the terminal 7b, and the transistors 45a and 44a and the transistors 45b and 44b are kept in the nonconductive state for the time lengths of the electrical signals 67a, 67b, . . . and the electrical signals 69a, 69b, . . . Thus, the above magnetic energy can be processed.

The time lengths of the electrical signals 67a, 67b, . . . and the electrical signals 69a, 69b, . . . are changed according to the width of the falling portion of current flowing in the exciting coil.

The operation of controlling energization of the exciting coils 17b, 17d and 17f by the curves 36a, 36b, . . . , 34a, 34b, . . . , and 35a, 35b, . . . is referred to as a B-phase energization mode.

The operation of controlling energization of the exciting coils 17a, 17c and 17e by the curves 31a, 31b, . . . , 32a, 32b, . . . , and 33a, 33b, . . . is referred to as an A-phase energization mode.

The three-phase motor as in this embodiment generally takes first-, second- and third-phase energization modes, but in this specification, the energization mode is divided into two energization modes which are referred to as the A- and B-phase energization modes.

The rotor 1 rotates in a direction of arrow A (FIG. 3(a)) by effecting energization of A-phase and B-phase and a voltage of the reference voltage terminal 46 of FIG. 6(a) may be raised in order to increase the output torque.

As described above, this embodiment has a feature that the rotation speed can be controlled by an applied voltage and the output torque can be controlled by a voltage of the reference voltage source.

The reverse rotation is effected by causing an A-phase position detection signal input to the terminals 43a, 43b and 43c to be supplied to the terminals 43e, 43f and 43d and causing a B-phase position detection signal input to the terminals 43d, 43e and 43f to be supplied to the terminals 43c, 43a and 43b.

The above-described input switching means is explained with reference to FIG. 5(b).

The position detection signal curves 31a, 31b, ..., curves 32a, 32b, ..., curves 33a, 33b, ..., curves 34a, 34b, ..., and curves 35a, 35b, ..., of FIG. 8(a) are respectively input to the terminals 8a, 8b, ..., and 8f.

When an input to the terminal 66 is at the high level, inputs to the lower side terminals of the AND circuits 66a, 66c, 66e, 66g, 66i and 66k are set to the high level and position detection signals for forward rotation can be derived from the terminals 9a, 9b, ..., and 9f via OR circuits 65a, 65b, ..., and 65f.

The output signals from the terminals 9a, 9b, ... and 9f are input respectively to the terminals 43a, 43b, ... and 43f in FIG. 6(a).

When the input to the terminal 66 is set to the low level, an electrical signal which is set to the high level by the inverter circuit 66a is input to the lower side terminals of the AND circuits 66b, 66d, ..., and 66l and position detection signals for reverse rotation can be derived from the terminals 9a, 9b, ..., and 9f via the OR circuits 65a, 65b, ..., and 65f.

Therefore, the forward and reverse rotation operations can be effected by the input signal to the terminal 66. If an input to the terminal 66 is set to the low level in the forward rotation operation, reversely rotating torque is generated, the time length of the rising portion of the exciting current by the chopper circuit becomes shorter than the time length of the falling portion, and the reason why the regenerative control is effected is the same as that explained for the two-phase motor with reference to FIG. 6(b).

The operation and effect of the selection switch 48 and rotation speed detection circuit 47 in FIG. 6(a) are the same as those effected by members indicated by the same symbols in FIG. 6(b) and it is possible to stop the motor by use of the regenerative control.

Energization of the exciting coil is started when the salient pole comes to face the magnetic pole and travels to a point of 30 degrees, the positions of the coils 10a, 10b and 10c serving as position detection elements are adjusted such that energization may be interrupted after rotation of 120 degrees and they are fixed in the positions on the armature side.

Therefore, in either case of the forward rotation or reverse rotation, the salient pole comes to face the magnetic pole, the exciting coil is energized when the salient pole comes to face the magnetic pole and further travels to a point of 30 degrees, and the energization is interrupted after rotation of 120 degrees so that the effect that the output torques in the forward and reverse rotation operations can be made equal to each other can be attained.

As described before for the two-phase motor, the above-described case is a case wherein the output torque caused by one exciting coil is symmetrical.

In a case where the initial torque caused when the salient pole starts to face the magnetic pole is large and the torque curve is asymmetrical as indicated by the curve 42 shown in the bottom row of FIG. 8(a), energization of the exciting coil is started when the salient pole has started to face the magnetic pole and is effected in the succeeding period of 120 degrees.

The period of 180 degrees in which the positive torque is generated in this case is indicated by an arrow 4b in FIG. 7. An arrow 4a indicates the period of 180 degrees in which the positive torque is generated in a case wherein the above output torque is symmetrical.

In this case, if the A-phase position detection signal and the B-phase position detection signal are replaced with each other, the rotation direction can be reversed, but a problem that the output torque will be changed in the forward and reverse rotation operations occurs.

In order to solve the above problem, the curves 31a, 31b, ... and the curves 36a, 36b, ... on the succeeding rows of FIG. 8(a) are used as the position detection signals in the forward rotation operation in the same manner as in the case of the two-phase motor.

In the reverse rotation operation, the curves 31a, 31b, ... and the curves 36a, 36b, ... on the succeeding rows are used as the position detection signals.

The curves 36a, 36b, ... are used as the curves 31a, 31b, ...

The curves 35a, 35b, ... are used as the curves 32a, 32b, .... The other curves are used in the same manner as described above.

As described above, an effective technical means can be provided since it is not necessary to use an additional position detection element for reverse rotation. In the reverse rotation operation, inverted forms of differential pulses derived from electrical signals indicated by the curves 31a, 31b, ... and the curves 36a, 36b, ... on the succeeding rows are used as electrical signals input to the terminals 7a and 7b in the same manner as in the case of the two-phase motor.

Thus, a feature that a torque curve similar to that of the three-phase Y-connection semiconductor motor and an efficient and relatively flat torque characteristic can be obtained can be provided by use of the above-described means.

The output torque can be controlled only by the reference voltage (a voltage of the terminal 46 in FIG. 6(a)) and is not influenced by an application voltage.

Thus, since the ripple voltage on the power source terminals 2a and 2b has little influence, the capacitance of a capacitor used for rectifying a voltage of an AC power source is not necessarily made large, and in a case wherein a three-phase AC power source is used, the capacitance of the capacitor can be further reduced and the power source can be made simple in construction.

In the two-phase motor of FIG. 3(c), since the magnetic poles are arranged symmetrically with respect to the axis and two of the magnetic poles which are disposed in the symmetrical positions are simultaneously energized, the magnetic attraction forces in the axial direction can be set in balance, thereby suppressing vibration in the radial direction during the rotation.

However, occurrence of vibration cannot be prevented because the gaps between the magnetic poles in the symmetrical positions and the corresponding salient poles cannot be made equal to each other.

In the motor of FIG. 1(a), since every two adjacent magnetic poles are combined to make one set and the magnetic poles are sequentially energized in one direction, the vector of the magnetic attraction force between the magnetic pole and salient pole in the radial direction rotates around the rotation shaft 5 according to the rotation speed of the rotor 1.

Therefore, since the rotor 1 rotates while being always depressed against the bearing, occurrence of vibration can be prevented.

However, in a high output power motor, force by which the rotation shaft 5 depresses the balls of the bearing becomes large, thereby reducing the service life thereof.

In a servomotor, several hundreds of thousands of revolutions are not necessary and several thousands of revolutions may be generally sufficient.

However, it is effective that the output torque is set to be large. In order to attain this, for example, projecting portions (which are referred to as teeth) having the same width as an open end of the magnetic path of each magnetic pole of FIG. 3(a) and separated from each other by the same angle are provided. Now, the magnetic pole 16c of FIG. 3(a) is explained as an example, and a recess portion indicated by a hatched portion 16m is formed. The same recess portion is formed in each of the other magnetic poles.

The width is set to $\frac{1}{3}$ of the width of the salient poles 1a, 1b, ... and the separation angle between the salient poles is set equal to the width of the salient pole. With the above construction, the output torque can be doubled. As a matter of course, the rotation speed becomes $\frac{1}{2}$ of the former case.

If the number of teeth is increased by n times (n=2, 3, ...), the output torque is increased by n times.

FIG. 6(d) shows a case wherein the diodes 100a and 100b and the transistors 44a and 44b of FIG. 6(a) are connected to the negative terminal 2b of the power source and the same operation and effect can be obtained.

The same signals input to the terminals 7a and 7b of FIG. 6(a) are input to terminals 7a and 7b.

The transistors 45e, 45f and 44a are turned on by a high level input signal to the terminal 7a and the transistors 45g, 45h and 44b are turned on by a high level input signal to the terminal 7b.

Diodes 100a and 100b serve to prevent the magnetic energy stored in the A- and B-phase exciting coils from flowing back to the power source side, respectively.

Therefore, the same operation and effect as those of a case of FIG. 6(a) can be obtained. In the embodiments of FIGS. 6(a), (b), (c) and (d), MOSFETs can be used instead of the transistors 44, 44a and 44b.

In the reverse rotation braking operation, the regenerative control is effected, but at this time, if a battery is used as the DC power source, the battery can be charged by the regenerative operation so that a complete power regenerating operation can be effected.

When the DC power source voltage is obtained by rectifying an AC voltage, the following means is used.

When a plurality of motors are driven by the DC power source terminals 2a and 2b, electric power at the time of regenerating operation can be used as the driving power for the other motor, thus effecting the regenerating operation.

If loads other than the motor, for example, lighting equipments, electric heaters, electric fans are supplied with electric power via the terminals 2a and 2b, the regenerated electric power is used as electric power for the loads.

When electric power is regenerated in the AC form for the AC power source, it is converted into AC power by use of a well-known negative converter and can be regenerated for the electric power source.

Next, a case wherein this invention is applied to a three-phase half-wave energization motor is explained with reference to FIG. 1(b).

The width of salient poles 1a, 1b, ... of a rotor 1 is 180 degrees, and they are disposed with a phase difference of 360 degrees at the same pitch.

The rotor 1 is constructed by a well-known means having silicon steel plates laminated and has a rotation shaft 5.

Magnetic poles 16a, 16b, 16c, 16d, 16e and 16f having the width of 180 degrees are disposed at an equal separation angle on a fixed armature 16. The widths of the magnetic pole and salient pole are set to 180 degrees and set to be equal to each other. The number of salient poles is 8 and the number of magnetic poles is 6. The armature 16 is constructed by the same means as the rotor 1.

FIG. 3(b) is a developed view of a reluctance type three-phase motor of FIG. 1(b).

Coils 10a, 10b and 10c of FIG. 3(b) are position detection elements for detecting the positions of the salient poles 1a, 1b, ... and are fixed on the side of the armature 16 in positions shown in the drawing, and the coil face is set to face the side surface of the salient poles 1a, 1b, ... with gaps set therebetween.

The coils 10a, 10b and 10c are disposed with a separation angle of 120 degrees.

The circuit of FIG. 4(a) is used as a means for deriving position detection signals and only outputs from the terminals 18a, 18b and 18c are used and other outputs are not necessary.

In FIG. 1(b) and the developed view of FIG. 3(b), the magnetic core 16 which is an annular portion and the magnetic poles 16a, 16b, ... constituted by a well-known means for laminating silicon steel plates and fixed on an outer casing (not shown) to form an armature. The magnetic core 16 constitutes a magnetic path.

The magnetic core 16 and the magnetic poles 16a, 16b, ... constitute an armature or stator.

In FIG. 3(b), exciting coils 17a, 17b, ... are wound on the magnetic poles 16a, 16b, ... The exciting coils 17a and 17d are connected in parallel or in series and the connected body is referred to as an exciting coil K.

The exciting coils 17b and 17e and the exciting coils 17c and 17f are connected in the same manner and the connected bodies are respectively referred to as exciting coils L and P.

When the exciting coil L is energized, the salient poles 1b and 1f are attracted and the rotor 1 rotates in a direction indicated by an arrow A. When it rotates through 90 degrees, energization of the exciting coil L is interrupted and the exciting coil P is energized.

When it further rotates through 120 degrees, energization of the exciting coil P is interrupted and the exciting coil K is energized.

The energization mode is cyclically changed for each rotation of 120 degrees in an order of exciting coil K→exciting coil L→exciting coil P, and it is driven as a three-phase half-wave motor.

At this time, the magnetic poles which lie in positions symmetrical with respect to the axis are magnetized to the N and S poles as shown in the drawing.

Thus, since the two magnetic poles are magnetized to have different magnetic polarities, leakage fluxes passing through non-magnetized magnetic poles flow in opposite directions, thereby prevent generation of counter torque.

In order to further reduce the leakage flux, the magnetic poles 16a and 16d of the first phase are combined to make one set and are magnetized to the N and S poles by energizing the respective exciting coils. The leakage fluxes of the magnetic poles constituting one set can be canceled by means of the other magnetic pole and thus extinguished, thereby eliminating the leakage flux.

Every two of the other magnetic poles 16b, 16c, ... , and 16f constitute one set and used as magnetic poles of one set which are magnetized to the N and S poles. The same effect can be obtained and the leakage flux can be extinguished. The number of the salient poles 1a, 1b, ... in this case is 16. The output torque is doubled in this case.

Next, an energization means for the exciting coils K, L and P is explained.

An object of this invention can be attained by effecting the energization control by use of an electric circuit in which the exciting coils K, L and P are used instead of the exciting coils 17a, 17c and 17e of FIG. 6(a).

As a matter of course, the energization circuit (AND circuits 15d, 15e and 15f, block circuits D, E and F, operational amplifier 46b, capacitor 47b, diode 100b, and transistors 44b and 45b) for the B-phase mode in FIG. 6(A) is omitted.

The exciting coils K, L and P are energized by currents indicated by dashed curves 37a, 37b, 37c, ... by supplying position detection signal curves 31a, 32a, 33a, ... of FIG. 7 via the terminals 43a, 43b and 43c, and in this case, exactly the same operation and effect as those obtained in a case of the A-phase energization mode shown in FIG. 6(a) can be attained, thus attaining the object of this invention.

INDUSTRIAL APPLICABILITY

This invention is used instead of a conventionally well-known induction motor and semiconductor motor (brushless motor) and particularly it is used as a driving motor for electric cars and servomotor in which the forward and reverse rotation operations are necessary.

I claim:

1. A two-phase reluctance type electric motor capable of effecting regenerative braking including a DC power source having a positive side and a negative side, comprising:

a position detecting device for detecting positions of salient poles of a rotor by use of a plurality of position detection elements fixed on a fixed armature side with a preset separation angle and deriving an electrical signal having first, second, third and fourth position detection signals of a width of 90 electrical degrees which are cyclically generated to continue to one another without being superposed on one another;

a plurality of first and second exciting coils each having first and second ends;

first semiconductor switching elements series-connected to the first and second ends of said first and second exciting coils, said plurality of first exciting coils and said plurality of second exciting coils respectively forming first- and second-phase exciting coils;

first diodes connected in a reverse direction to the series-connected bodies of said first semiconductor switching elements and said exciting coils;

an energization control circuit for energizing said first semiconductor switching elements series-connected to both ends of said first and second exciting coils according to the first, second, third and fourth position detection signals to energize said exciting coils by means of a DC power source so as to rotate the motor in a forward direction or energizing said first semiconductor switching elements series-connected to said first and second exciting coils according to the position detection signals which cause reverse-rotation torque to energize said exciting coils by means of said DC power source so as to rotate the motor in a reverse direction;

a detection circuit for deriving detection signals proportional to exciting currents flowing in said exciting coils;

first and second chopper circuits for holding said exciting currents to preset values according to the detection signal outputs of said detection circuit;

a second diode for reverse current prevention connected to the DC power source;

a second semiconductor switching element for short-circuiting connected in parallel with said second diode, the current conducting direction being set to an opposite direction;

an electric circuit for holding said second semiconductor switching element for short-circuiting in an OFF state for a first period of time corresponding to a short time length of an electrical signal obtained at an end of the first, second, third and fourth position detection signals and holding said second semiconductor switching element in an ON state during a second period of time in response to the electrical signal;

an electric circuit for preventing magnetic energy stored in one of said exciting coils when energization of a corresponding one of said exciting coils is interrupted at the end of a corresponding one of the position detection signals is fed back to the DC power source via said second diode of reverse current prevention connected switching element for short-circuiting, causing the stored magnetic energy to flow into the exciting coils to be energized by a next one of the position detection signals to rapidly extinguish the same and eliminating counter torque and reduced torque which are respectively generated by energization caused by discharge of the magnetic energy and energization caused from a starting portion of the position detection signal until the exciting current rises to a preset value;

an electric circuit for making the rise of current during the energization by said chopper circuit steeper by adding together the electromotive force caused by reduction in the amount of flux crossing the exciting coils and the DC power source voltage when a rotating operation is changed to a reverse rotation mode during the forward rotating direction and making the fall of the DC power source voltage dull to effect electromagnetic braking by supplying current to the positive side of the DC power source via said second semiconductor switching element for short-circuiting by a voltage obtained by adding together the electromagnetic force caused by reduction in the amount of flux crossing the exciting coils in the falling portion of current and the electromagnetic force caused by discharge of magnetic energy stored in the exciting coils so as to regenerate electric power; and means for adjusting and fixing the positions of said position detection elements so that energization of said exciting coils can be effected to make the output torque of said exciting coils maximum.

2. A three-phase reluctance type electric motor capable of effecting regenerative braking including a DC power source, comprising:

a position detecting device having three position detection elements disposed separately from one another by 120 electrical degrees, for detecting the positions of salient poles of a rotor to derive an A-phase position detection signal having first, second and third position detection signals which each have a width of 120 electrical degrees and are cyclically generated to continue to one another without being superposed on one another and fourth, fifth and sixth position detection signals of B phase of the same construction which have a phase difference of 60 electrical degrees with respect to the A-phase position detection signal and are cyclically generated;

a plurality of exciting coils each having first and second ends;

first semiconductor switching elements series-connected to the first and second ends of A- and B-phase exciting coils, a first-phase exciting coil is constructed by a plurality of first exciting coils, a second-phase exciting coil is constructed by a plurality of second exciting coils, a third-phase exciting coil is constructed by a plurality of third exciting coils, first ones of said first, second and third exciting coils are combined to form said A-phase exciting coil, and second ones of said first, second and third exciting coils are combined to form said B-phase exciting coil;

first diodes connected in a reverse direction to the series-connected bodies of said first semiconductor switching elements and said exciting coils;

a first energization control circuit for energization control of said A-phase exciting coil and a second energization control circuit for energization control of said B-phase exciting coil, for cyclically energizing said first semiconductor switching elements series-connected to both ends of said A-phase exciting coil in response to the A-phase position detection signal to supply current to a corresponding one of said exciting coils from a DC power source, and cyclically energizing said first semiconductor switching elements series-connected to both ends of said B-phase exciting coil in response to the B-phase position detection signal to supply current to a corresponding one of said exciting coils from the DC power source so as to rotate the motor in a forward direction, or cyclically energizing said first semiconductor switching elements series-connected to both ends of said B-phase exciting coil in response to the A-phase position detection signal to supply current to a corresponding one of said exciting coils from the DC power source, and cyclically energizing said first semiconductor switching elements series-connected to both ends of said B-phase exciting coil in response to the A-phase position detection signal to supply current to a corresponding one of said exciting coils from the DC power source so as to rotate the motor in a reverse direction;

first and second detection circuits for deriving first and second detection signals proportional to exciting currents flowing in said A-phase and B-phase exciting coils;

first and second chopper circuits for holding the exciting currents in said A-phase and B-phase exciting coils at preset values;

second and third diodes for reverse current prevention connected to the DC power source for supplying current to said first and second energization control circuits;

second and third semiconductor switching elements for short-circuiting respectively connected in parallel with said second and third diodes and having current conducting directions set in the opposite directions to each other;

an electric circuit for holding said second and third semiconductor switching elements for short-circuiting in an OFF state for a first period of time corresponding to a short time length of an electrical signal obtained at an end of the A-phase and B-phase position detection signals and holding them in an ON state during a second period of time;

an electric circuit for preventing magnetic energy stored in one of said exciting coils when energization of a corresponding one of said exciting coils is interrupted at the end of a corresponding one of the A-phase and B-phase position detection signals is fed back to the DC power source via said second or third diode of reverse current prevention connected in parallel with said second or third semiconductor switching element for short-circuiting, causing the stored magnetic energy to flow into a next one of said exciting coils to be energized by a next one of the position detection signals to rapidly extinguish the same and eliminating counter torque and reduced torque which are respectively generated by energization caused by discharge of the magnetic energy and energization caused from a starting portion of the position detection signal until the exciting current rises to a preset value;

an electric circuit for making the rise of current during the energization by the chopper circuit steeper by adding together the electromotive force caused by reduction in the amount of magnetic flux crossing said exciting coils and the DC power source voltage when a rotating operation is changed to a reverse rotation mode in the forward rotating direction and making the fall of the DC power source voltage dull to effect electromagnetic braking by supplying current to the positive side of the DC power source via said second or third semiconductor switching element for short-circuiting by a voltage obtained by adding together the electromagnetic force caused by reduction in the amount of magnetic flux crossing said exciting coils in the falling portion of current and the electromagnetic force caused by discharge of magnetic energy stored in said exciting coils so as to regenerate electric power; and means for adjusting and fixing the positions of said position detection elements so that energization of said exciting coils can be effected to make the output torque of said exciting coils maximum.

3. A three-phase half-wave reluctance type electric motor capable of effecting regenerative braking, comprising:

a position detecting device including three position detection elements for deriving a position detection signal having first, second and third position detection signals which each have a width of 120 electrical degrees and are cyclically generated to continue to one another without being superposed on one another so as to detect the position of a rotor;

first-, second- and third-phase exciting coils having first and second ends wound on first-, second- and third-phase magnetic poles;

first semiconductor switching elements series-connected to the first and second ends of said first-, second- and third-phase exciting coils;

first diodes connected in a reverse direction to series-connected bodies of said first semiconductor switching elements and said exciting coils;

an energization control circuit for cyclically energizing said first semiconductor switching elements series-connected to both ends of said first, second and third exciting coils according to the first, second and third position detection signals to energize a corresponding one of said exciting coils by means of a DC power source so as to rotate the motor in a forward direction, or cyclically energizing said first semiconductor switching elements series-connected to said first and second exciting coils according to the three-phase position detection signals which cause reverse-rotation torque to energize said exciting coils by means of the DC power source so as to rotate the motor in a reverse direction;

a detection circuit for deriving detection signals proportional to exciting currents flowing in said exciting coils;

first and second chopper circuits for holding the exciting currents to preset values according to the detection signal outputs of said detection circuit;

a second diode for reverse current prevention connected to the DC power source for supplying current to said energization control circuit;

a second semiconductor switching element for short-circuiting connected in parallel with said second diode for reverse current prevention, the current conducting direction thereof being set in an opposite direction;

an electric circuit for holding said second semiconductor switching element for short-circuiting in an OFF state for a first period of time corresponding to a short time length of an electrical signal obtained at an end of the three-phase position detection signals and holding said second semiconductor switching element in an ON state during a second period of time in response to the electrical signal;

an electric circuit for preventing magnetic energy stored in one of said exciting coils when energization of a corresponding one of said exciting coils is interrupted at the end of a corresponding one of the three-phase position detection signals is fed back to the DC power source via said second diode of reverse current prevention connected in parallel with said second semiconductor switching element for short-circuiting, causing the stored magnetic energy to flow into the exciting coils to be energized by a next one of the position detection signals to rapidly extinguish the same and eliminating counter torque and reduced torque which are respectively generated by energization caused by discharge of the magnetic energy and energization caused from a starting portion of the position detection signal until the exciting current rises to a preset value;

an electric circuit for making the rise of current during the energization by said chopper circuit steeper by adding together the electromotive force caused by reduction in the amount of magnetic flux crossing said exciting coils and the DC power source voltage when a rotating operation is changed to a reverse rotation mode in the forward rotating direction and making the fall of the current dull to effect electromagnetic braking by supplying current to the positive side of the DC power source via said second semiconductor switching element for short-circuiting by a voltage obtained by adding together the electromagnetic force caused by reduction in the amount of magnetic flux crossing said exciting coils in the falling portion of current and the electromagnetic force caused by discharge of magnetic energy stored in said exciting coils so as to regenerate electric power; and means for adjusting and fixing the positions of said position detection elements so that energization of said exciting coils can be effected to make the output torque of the exciting coils maximum.

* * * * *

UNITED STATES PATENT AND TRADEMARK OFFICE
CERTIFICATE OF CORRECTION

PATENT NO. : 5,111,091
DATED : MAY 5, 1992
INVENTOR(S) : ITSUKI BAHN

It is certified that error appears in the above-identified patent and that said Letters Patent is hereby corrected as shown below:

TITLE PAGE [57] ABSTRACT line 15, "attached" should be --attained--.

Col. 6, line 34, "counterelectromotive" should be --counter-electromotive--.

Col. 28, line 31, "connected switching" should be --connected in parallel with said second semiconductor switching--.

Signed and Sealed this

Seventh Day of September, 1993

Attest:

BRUCE LEHMAN

Attesting Officer

Commissioner of Patents and Trademarks